US009826377B2

(12) United States Patent
Itoh et al.

(10) Patent No.: US 9,826,377 B2
(45) Date of Patent: Nov. 21, 2017

(54) INFORMATION PROCESSING APPARATUS, INFORMATION PROCESSING SYSTEM, AND INFORMATION PROCESSING METHOD

(71) Applicants: Masahiko Itoh, Kanagawa (JP); Hiroyoshi Kuroda, Kanagawa (JP); Yuji Ohue, Kanagawa (JP); Tsutomu Kawase, Kanagawa (JP)

(72) Inventors: Masahiko Itoh, Kanagawa (JP); Hiroyoshi Kuroda, Kanagawa (JP); Yuji Ohue, Kanagawa (JP); Tsutomu Kawase, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/157,580

(22) Filed: May 18, 2016

(65) Prior Publication Data

US 2016/0353265 A1 Dec. 1, 2016

(30) Foreign Application Priority Data

May 26, 2015 (JP) ................................. 2015-106765

(51) Int. Cl.
*H04M 11/04* (2006.01)
*H04W 4/22* (2009.01)
*H04L 29/08* (2006.01)
*H04W 76/00* (2009.01)

(52) U.S. Cl.
CPC ............... *H04W 4/22* (2013.01); *H04L 67/18* (2013.01); *H04W 76/007* (2013.01)

(58) Field of Classification Search
None
See application file for complete search history.

(56) References Cited

U.S. PATENT DOCUMENTS

| 2009/0042533 | A1* | 2/2009 | Lontka | G08B 7/06 455/404.1 |
|---|---|---|---|---|
| 2013/0329059 | A1* | 12/2013 | Uchikoshi | G06F 3/005 348/207.1 |
| 2014/0253326 | A1* | 9/2014 | Cho | H04W 4/22 340/539.13 |
| 2016/0269882 | A1* | 9/2016 | Balthasar | G01C 21/00 |

FOREIGN PATENT DOCUMENTS

JP H06-111172 4/1994

* cited by examiner

*Primary Examiner* — Charles Appiah
*Assistant Examiner* — Alexander Yi
(74) *Attorney, Agent, or Firm* — IPUSA, PLLC

(57) ABSTRACT

An information processing apparatus is provided that includes a memory and a processor couple to the memory and configured to execute steps of storing corresponding information associating a predetermined event with position information relating to a position of an output apparatus and providing information corresponding to the position; acquiring sender information from a sender, wherein the sender information includes sender identification information of the sender and the own apparatus information that has been output by the output apparatus and acquired by the sender; collecting event information relating to the predetermined event that is occurring; selecting the providing information to be provided to the sender based on the acquired sender information and the collected event information; and sending the selected providing information to the sender.

8 Claims, 22 Drawing Sheets

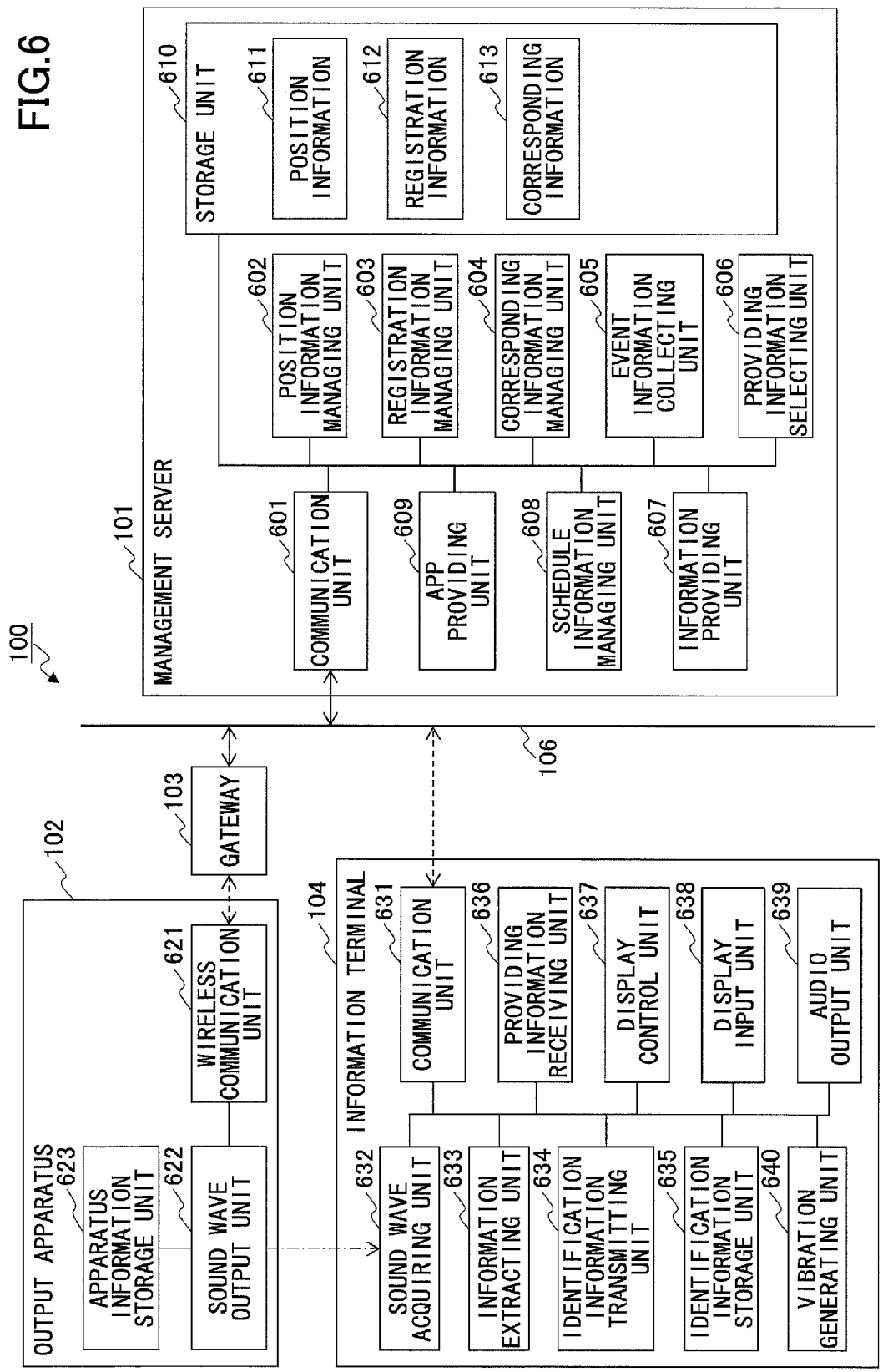

FIG.7B

| SENDER ID (APP ID) | OUTPUT APPARATUS ID | POSITION | ACQUISITION DATE/TIME |
|---|---|---|---|
| AP0001 | SP0005 | POINT 5 | 20xx/4/3 10:00 |
| AP0002 | SP0001 | POINT 1 | 20xx/4/3 9:30 |
| AP0003 | SP0002 | POINT 2 | 20xx/4/3 10:05 |
| ... | ... | ... | ... |

FIG.7A

| OUTPUT APPARATUS ID | POSITION |
|---|---|
| SP0001 | POINT 1 |
| SP0002 | POINT 2 |
| SP0003 | POINT 3 |
| SP0004 | POINT 4 |
| SP0005 | POINT 5 |
| SP0006 | POINT 6 |
| SP0007 | POINT 7 |
| SP0008 | POINT 8 |
| SP0009 | POINT 9 |

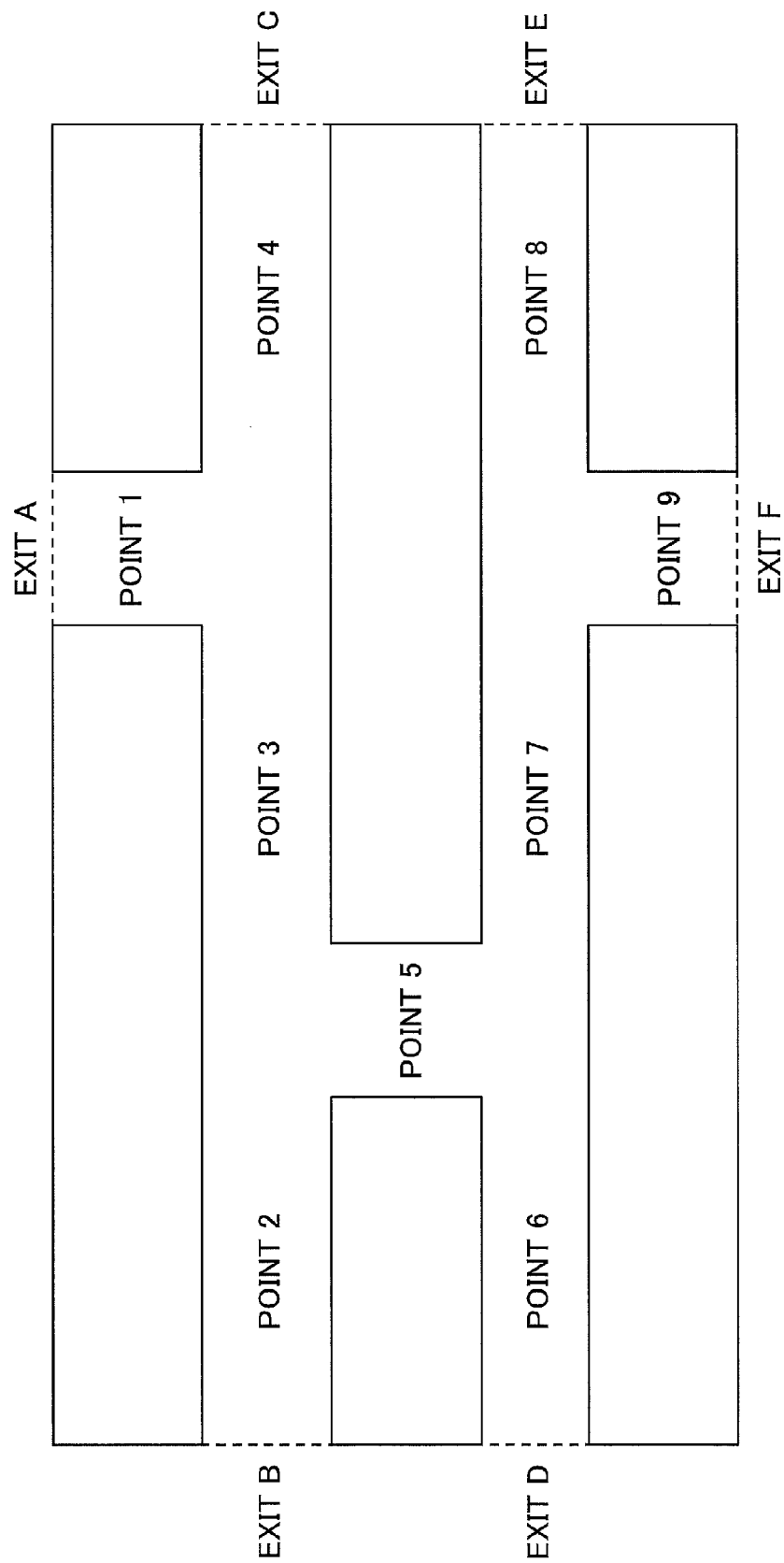

FIG.8

| USER ID (APP ID) | REGISTRATION DATE/TIME | USER INFORMATION |
|---|---|---|
| AP0001 | 20xx/11/3 10:00 | DISASTER PREVENTION STAFF MEMBER |
| AP0002 | 20xx/12/9 15:05 | EMPLOYEE |
| AP0003 | 20xx/1/6 11:24 | EMPLOYEE |
| AP0004 | 20xx/1/23 11:00 | GENERAL CUSTOMER |
| AP0005 | 20xx/1/24 12:00 | ELDERLY |
| AP0006 | 20xx/1/25 13:00 | VISUALLY IMPAIRED |
| AP0007 | 20xx/1/26 13:00 | – |
| ... | ... | ... |

FIG.9A

| EVENT | OUTPUT APPARATUS ID | POSITION | PROVIDING INFORMATION |
|---|---|---|---|
| FIRE | SP0001 | POINT 1 | ROUTE INFORMATION TO EXIT A |
| | SP0002 | POINT 2 | ROUTE INFORMATION TO EXIT B |
| | ... | ... | ... |
| | SP0009 | POINT 9 | ROUTE INFORMATION TO EXIT F |
| | ... | ... | ... |
| EARTHQUAKE | ... | ... | ... |
| TRAIN DELAY | ... | ... | ... |
| TRAFFIC JAM | ... | ... | ... |
| ... | ... | ... | ... |
| DETECTION AT POINT 6 | SP0006 | POINT 6 | WEATHER INFORMATION |
| DETECTION AT POINT 7 | SP0007 | POINT 7 | SHOP A INFORMATION |
| DETECTION AT POINT 8 | SP0008 | POINT 8 | TRAIN SERVICE INFORMATION |
| ... | ... | ... | ... |
| EVENT A START TIME | SP0001 SP0002 . . SP0009 | POINT 1 POINT 2 . . POINT 9 | EVENT INFORMATION (NOTIFICATION & AUDIBLE SOUND) |
| 20 MINUTES BEFORE LAST TRAIN | SP0001 SP0002 . . SP0009 | POINT 1 POINT 2 . . POINT 9 | LAST TRAIN INFORMATION (NOTIFICATION & AUDIBLE SOUND) |
| ... | ... | ... | ... |

FIG.9B

| EVENT | OUTPUT APPARATUS ID | POSITION | PROVIDING INFORMATION |
|---|---|---|---|
| FIRE | SP0001 | POINT 1 | ROUTE INFORMATION TO FIRE OUTBREAK LOCATION |
| | SP0002 | POINT 2 | ROUTE INFORMATION TO FIRE OUTBREAK LOCATION |
| | ... | ... | ... |
| | SP0009 | POINT 9 | ROUTE INFORMATION TO FIRE OUTBREAK LOCATION |
| | ... | ... | ... |
| EARTHQUAKE | ... | ... | ... |
| TRAIN DELAY | ... | ... | ... |
| TRAFFIC JAM | ... | ... | ... |
| ... | ... | ... | ... |
| EVENT A START TIME | SP0001<br>SP0002<br>.<br>.<br>SP0009 | POINT 1<br>POINT 2<br>.<br>.<br>POINT 9 | EVENT INFORMATION (NOTIFICATION & AUDIBLE SOUND) |
| 20 MINUTES BEFORE LAST TRAIN | SP0001<br>SP0002<br>.<br>.<br>SP0009 | POINT 1<br>POINT 2<br>.<br>.<br>POINT 9 | LAST TRAIN INFORMATION (NOTIFICATION & AUDIBLE SOUND) |
| ... | ... | ... | ... |

FIG.10A

| EVENT | OUTPUT APPARATUS ID | POSITION | PROVIDING INFORMATION |
|---|---|---|---|
| FIRE | SP0001 | POINT 1 | EVACUATION GUIDANCE INFORMATION TO EXIT A |
|  | SP0002 | POINT 2 | EVACUATION GUIDANCE INFORMATION TO EXIT B |
|  | ... | ... | ... |
|  | SP0009 | POINT 9 | EVACUATION GUIDANCE INFORMATION TO EXIT F |
|  | ... | ... | ... |
| EARTHQUAKE | ... | ... | ... |
| TRAIN DELAY | ... | ... | ... |
| TRAFFIC JAM | ... | ... | ... |
| ... | ... | ... | ... |
| EVENT A START TIME | SP0001<br>SP0002<br>.<br>.<br>.<br>SP0009 | POINT 1<br>POINT 2<br>.<br>.<br>.<br>POINT 9 | EVENT INFORMATION (NOTIFICATION & AUDIBLE SOUND) |
| 20 MINUTES BEFORE LAST TRAIN | SP0001<br>SP0002<br>.<br>.<br>SP0009 | POINT 1<br>POINT 2<br>.<br>.<br>POINT 9 | LAST TRAIN INFORMATION (NOTIFICATION & AUDIBLE SOUND) |
| ... | ... | ... | ... |

FIG.10B

| EVENT | OUTPUT APPARATUS ID | POSITION | PROVIDING INFORMATION |
|---|---|---|---|
| FIRE | SP0001 | POINT 1 | EVACUATION GUIDANCE INFORMATION BY AUDIBLE SOUND |
| | SP0002 | POINT 2 | EVACUATION GUIDANCE INFORMATION BY AUDIBLE SOUND |
| | ... | ... | ... |
| | SP0009 | POINT 9 | EVACUATION GUIDANCE INFORMATION BY AUDIBLE SOUND |
| | ... | ... | ... |
| EARTHQUAKE | ... | ... | ... |
| TRAIN DELAY | ... | ... | ... |
| TRAFFIC JAM | ... | ... | ... |
| ... | ... | ... | ... |
| DETECTION AT POINT 6 | SP0006 | POINT 6 | WEATHER INFORMATION BY AUDIBLE SOUND |
| DETECTION AT POINT 7 | SP0007 | POINT 7 | SHOP A INFORMATION BY AUDIBLE SOUND |
| DETECTION AT POINT 8 | SP0008 | POINT 8 | TRAIN SERVICE INFORMATION BY AUDIBLE SOUND |
| ... | ... | ... | ... |
| EVENT A START TIME | SP0001<br>SP0002<br>.<br>.<br>.<br>SP0009 | POINT 1<br>POINT 2<br>.<br>.<br>.<br>POINT 9 | EVENT INFORMATION (NOTIFICATION & AUDIBLE SOUND) |
| 20 MINUTES BEFORE LAST TRAIN | SP0001<br>SP0002<br>.<br>.<br>.<br>SP0009 | POINT 1<br>POINT 2<br>.<br>.<br>.<br>POINT 9 | LAST TRAIN INFORMATION (NOTIFICATION & AUDIBLE SOUND) |
| ... | ... | ... | ... |

FIG.19

| APP ID | REGISTRATION DATE/TIME | APP INFORMATION |
|---|---|---|
| AP0001 | 20xx/11/3 10:00 | WEATHER FORECAST APP |
| AP0002 | 20xx/12/9 15:05 | NEWS APP |
| AP0003 | 20xx/1/6 11:24 | TRANSPORTATION APP |
| AP0004 | 20xx/1/23 11:00 | MAP APP |
| AP0005 | 20xx/1/24 12:00 | NEWS APP |
| AP0006 | 20xx/1/25 13:00 | TRANSPORTATION APP |
| AP0007 | 20xx/1/26 13:00 | – |
| ... | ... | ... |

US 9,826,377 B2

INFORMATION PROCESSING APPARATUS, INFORMATION PROCESSING SYSTEM, AND INFORMATION PROCESSING METHOD

CROSS-REFERENCE TO RELATED APPLICATION

The present application is based on and claims priority to Japanese Patent Application No. 2015-106765 filed on May 26, 2015, the entire contents of which are incorporated herein by reference.

BACKGROUND OF THE INVENTION

1. Field of the Invention

The present invention relates to an information processing apparatus, an information processing system, and an information processing method.

2. Description of the Related Art

Systems for providing evacuation information when a disaster such as a fire occurs within a building, such as an office or a shopping mall, are known.

SUMMARY OF THE INVENTION

According to one embodiment of the present invention, an information processing apparatus is provided that controls information to be provided according to an event that is occurring. The information processing apparatus includes a memory, and a processor coupled to the memory and configured to execute steps of storing corresponding information associating a predetermined event with position information relating to a position of an output apparatus that outputs own apparatus information and providing information corresponding to the position of each of the plurality of output apparatuses; acquiring sender information from a sender, wherein the sender information includes sender identification information of the sender and the own apparatus information that has been output by the output apparatus and acquired by the sender; collecting event information relating to the predetermined event that is occurring; selecting the providing information to be provided to the sender based on the acquired sender information and the collected event information; and sending the selected providing information to the sender.

BRIEF DESCRIPTION OF THE DRAWINGS

FIG. 6 is a block diagram showing an example functional configuration of the information processing system according to an embodiment of the present invention;

FIGS. 7A-7C show examples of position information managed by a position information managing unit according to an embodiment of the present invention;

FIG. 8 shows an example of registration information managed by a registration information managing unit according to an embodiment of the present invention;

FIGS. 9A and 9B show examples of corresponding information managed by a corresponding information managing unit according to an embodiment of the present invention;

FIGS. 10A and 10B show further examples of the corresponding information managed by the corresponding information managing unit;

FIG. 19 shows another example of registration information managed by the registration information managing unit according to an embodiment of the present invention.

DESCRIPTION OF EMBODIMENTS

When a system displays evacuation guidance information to a plurality of persons, evacuating persons that view such information will presumably move toward the same evacuation exit. In this respect, a system is desired that can provide suitable evacuation guidance information to each individual user depending on whether the user is a general user/customer, an employee, or a disaster prevention staff member, for example.

An aspect of the present invention is directed to enabling an information processing apparatus that provides information according to a currently occurring event to provide suitable information for each individual user.

In the following, embodiments of the present invention are described with reference to the accompanying drawings.

<System Configuration>

Figure 1:
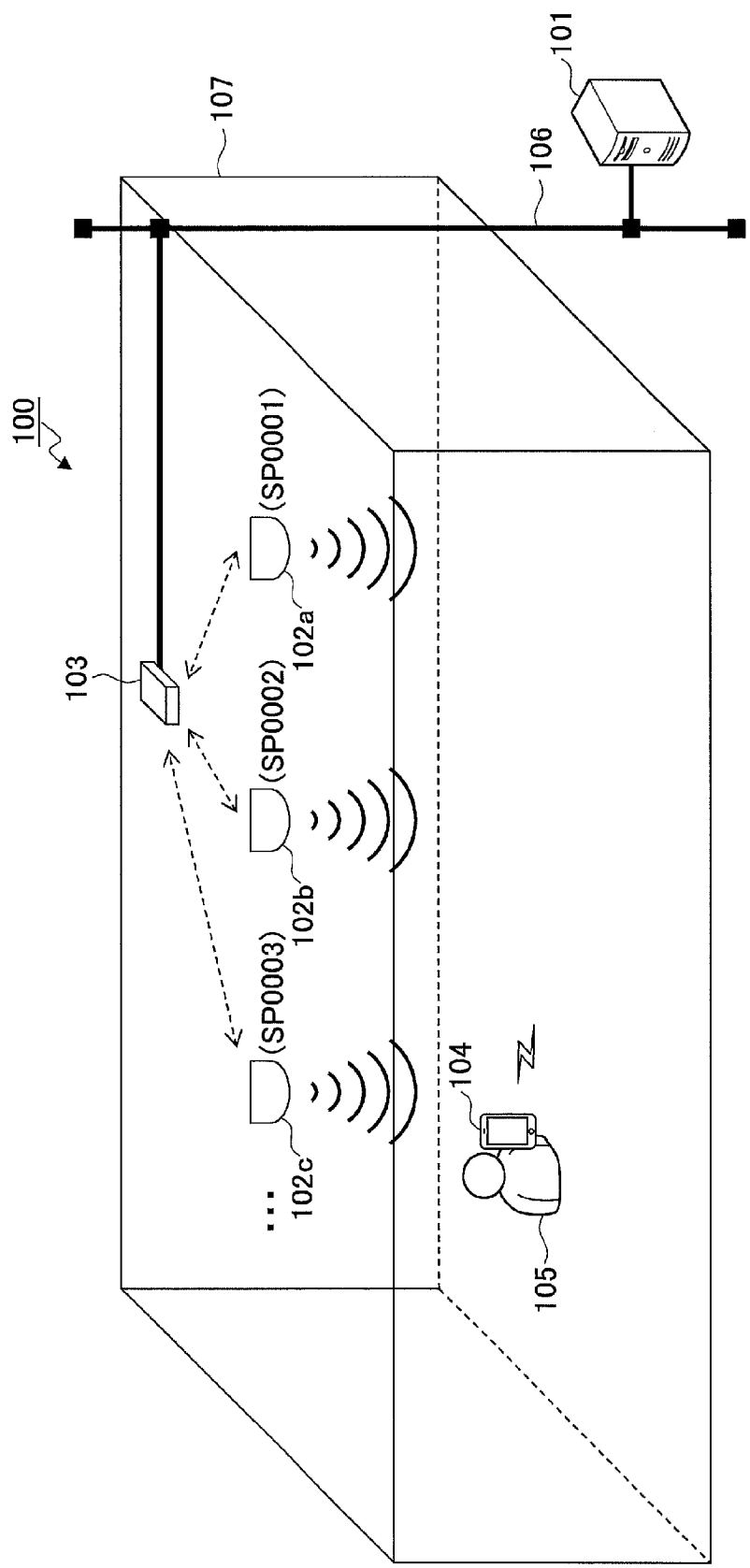
FIG. 1 is a diagram showing an example configuration of an information processing system according to an embodiment of the present invention.

FIG. 1 shows an example configuration of an information processing system 100 according to an embodiment of the present invention. In FIG. 1, the information processing system 100 includes a management server 101, a plurality of output apparatuses 102a-102c, a gateway 103, and an information terminal 104. Note that in the descriptions below, a given output apparatus among the plurality of output apparatuses 102a-102c may simply be referred to as "output apparatus 102". Also, note that the number the devices, such as the output apparatus 102, the gateway 103, and the information terminals 104, provided in the information processing system 100 is not particularly limited, and FIG. 1 merely shows one example arrangement of such devices.

The plurality of output apparatuses 102a-102c may be installed at different locations on the ceiling of a building 107, for example. Each output apparatus 102 outputs a signal including own apparatus information of the output apparatus 102, such as identification information of the output apparatus 102 or position information of the output apparatus 102.

In the example shown in FIG. 1, the output apparatus 102a outputs a sound wave including an apparatus ID "SP0001" corresponding to identification information identifying the output apparatus 102a. Similarly, the output apparatus 102b outputs a sound wave including an apparatus ID "SP0002" corresponding to identification information identifying the output apparatus 102b, and the output apparatus 102c outputs a sound wave including an apparatus ID "SP0003" corresponding to identification information identifying the output apparatus 102c.

Also, the output apparatuses 102 are connected to a wireless network that is provided by the gateway 103 so that the output apparatuses 102 may communicate with the management server 101 via the gateway 103. Note that each of the output apparatuses 102 may be configured to output an output apparatus ID designated by the management server 101, or a pre-set output apparatus ID stored in its own memory, for example.

The gateway 103 may be connected to the management server 101 via a network 106, such as the Internet or a LAN (local area network), for example. The gateway 103 forms a wireless network with the output apparatuses 102. The gateway 103 routes data to be exchanged between the management server 101 and the output apparatuses 102 that are connected to the wireless network provided by the gateway 103.

The information terminal 104 may be a terminal device, such as a smartphone, a mobile phone, or a tablet terminal, that is carried by a user 105, for example. The information terminal 104 is capable of establishing connection with the network through wireless communication in order to communicate with the management server 101. Also, the information terminal 104 executes an application program (hereinafter referred to as "app") for enabling the information terminal 104 to implement relevant features of the information processing system 100.

By executing the app for the information terminal 104, the information terminal 104 acquires a sound wave output by the output apparatus 102 using an internal microphone, for example, and extracts own apparatus information of the output apparatus 102 (e.g., output apparatus ID of the output apparatus 102) that is included in the acquired sound wave. Also, the app for the information terminal 104 includes unique identification information (hereinafter referred to as "app ID") identifying each individual app installed in the information terminal 14. Once the information terminal 104 executes the app and extracts own apparatus information of the output apparatus 102, the information terminal 104 transmits sender information including the extracted own apparatus information of the output apparatus 102 and the app ID of the app that is run on the information terminal 104 to the management server 101.

Note that the app ID is an example of sender identification information identifying the information terminal 104 sending the sender information, user identification information identifying the user of the information terminal 104, and identification information of the app that is run on the information terminal 104. By using the app ID, the information processing system 100 may be able to identify the information terminal 104 without referring to personal information such as a phone number or an email address of the information terminal 104, for example. Note, however, that the app ID is merely one example of identification information that may be used to identify an information terminal 104, a user, or an app, and in other examples, identification information of the information terminal 104 or identification information of the user 105 using the information terminal 104 may be used.

The management server 101 may be an information processing apparatus, such as a PC (Personal Computer) that is connected to the network 106. The management server 101 executes an app for enabling the management server 101 to implement relevant features of the information processing system 100. The management server 101 manages position information including information on the location of each of the output apparatuses 102 and is capable of identifying the position of the information terminal 104 based on the sender information acquired from the information terminal 104.

Also, the management server 101 collects event information of a predetermined event, such as disaster information, traffic information, schedule information, or the like, and provides suitable information to each information terminal 104 according to the position of each information terminal 104.

<Hardware Configuration>

In the following, hardware configurations of the individual devices included in the information processing system 100 are described.

(Hardware Configuration of Management Server)

Figure 2:
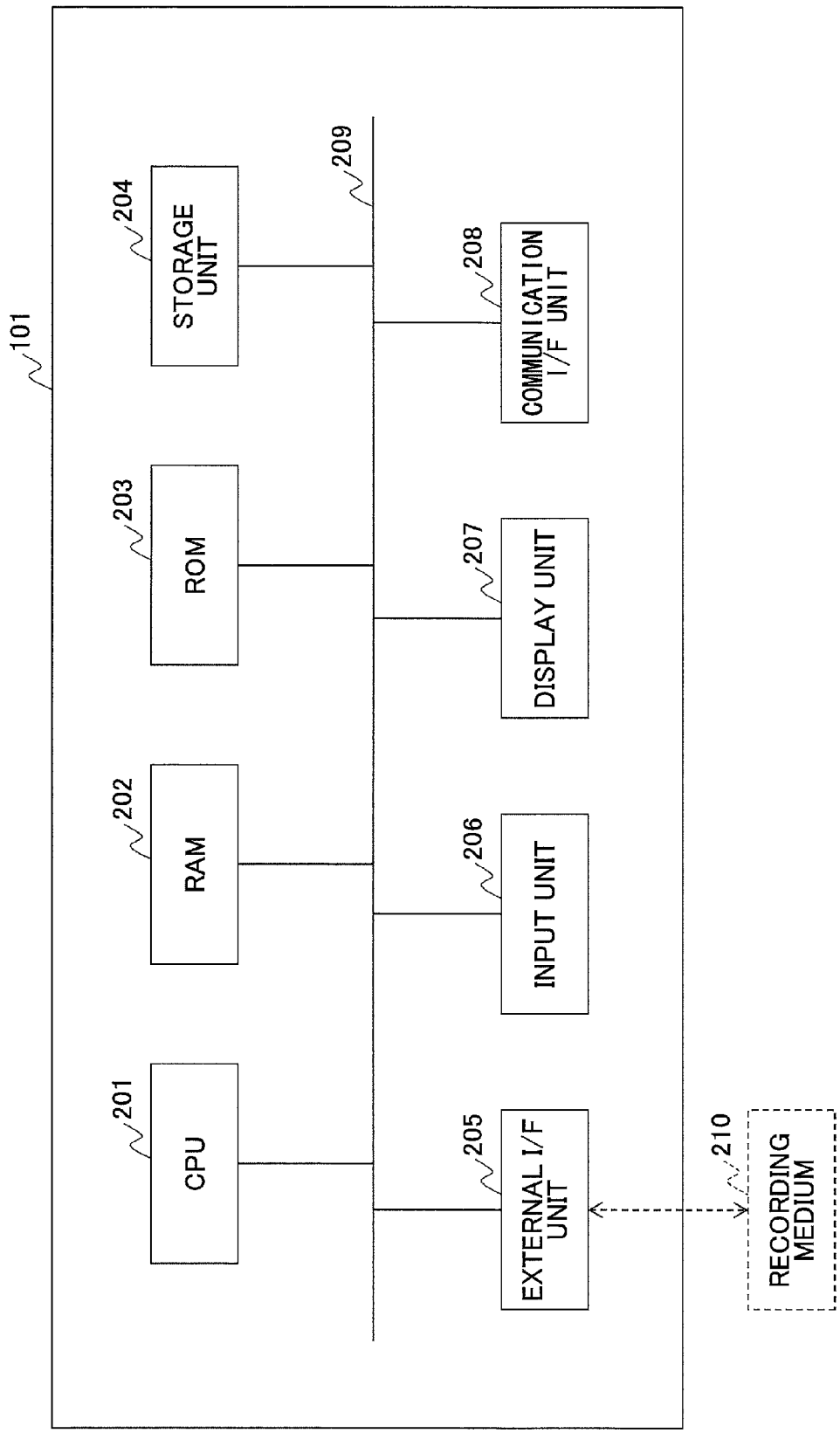
FIG. 2 is a block diagram showing an example hardware configuration of a management server according to an embodiment of the present invention.

FIG. 2 is a block diagram showing an example hardware configuration of the management server 101 according to an embodiment of the present invention. In FIG. 2, the management server 101 has a configuration of a general-purpose computer including a CPU (Central Processing Unit) 201, a RAM (Random Access Memory) 202, a ROM (Read Only Memory) 203, a storage unit 204, an external I/F (Interface) unit 205, an input unit 206, a display unit 207, a communication I/F unit 208, and a bus 209.

The CPU 201 includes an arithmetic and logic unit that reads a program and/or data from a storage device such as the ROM 203 and/or the storage unit 204, loads the program and/or data in the RAM 202, and executes processes according to the program and/or data to control the overall operations and functions of the management server 101. The RAM 202 is a volatile memory (storage device) that is used as a working area of the CPU 201. The ROM 203 is a nonvolatile memory (storage device) that can retain programs and/or data even when the power is turned off.

The storage unit 204 may be a storage device, such as an HDD (Hard Disk Drive) or an SSD (Solid State Drive), that stores an OS (Operating System), application programs, and various data, for example.

The external I/F unit 205 is an interface with an external device. The external device may be a recording medium 210, for example. The management server 101 may read information from and/or write information on the recording medium 201 via the external I/F unit 205. Specific examples of the recording medium 210 include an optical disk, a magnetic disk, a memory card, a universal serial bus (USB) memory, and the like. Also, a predetermined program may be stored in the recording medium 210 and the predetermined program may be run and executed by being installed in the management server 101 via the external I/F unit 205, for example.

The input unit 206 may include a keyboard and/or a mouse, for example, and is used to input various operation signals to the management server 101. The display unit 207 may include a display, for example, and is configured to display processing results of the management server 101.

The communication I/F unit 208 is a communication interface such as a wired/wireless LAN that connects the management server 101 to the network 106. In this way, the management server 101 may establish data communication with other computers via the communication I/F unit 208. The bus 209 is connected to the above-described elements of the management server 101 and transmits signals, such as an address signal, a data signal, and various control signals.

(Hardware Configuration of Output Apparatus)

Figure 3:
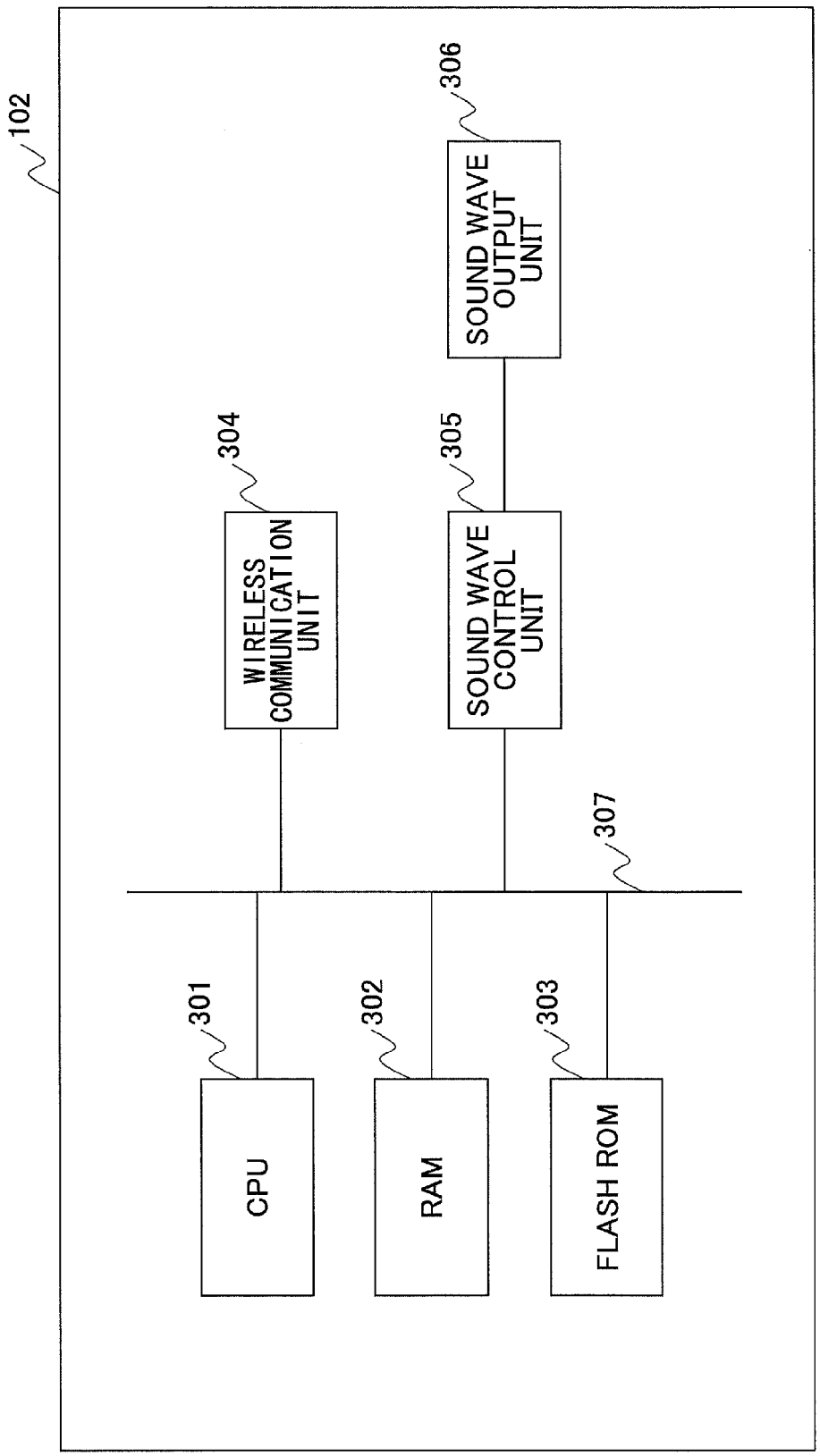
FIG. 3 is a block diagram showing an example hardware configuration of an output apparatus according to an embodiment of the present invention.

FIG. 3 is a block diagram showing an example hardware configuration of the output apparatus 102 according to an embodiment of the present invention. In FIG. 3, the output apparatus 102 includes a CPU 301, a RAM 302, a flash ROM 303, wireless communication unit 304, a sound wave control unit 305, a sound wave output unit 306, and a bus 307.

The CPU 301 is an arithmetic unit that implements various functions of the output apparatus 102 by executing a relevant program stored in the flash ROM 303, for example. The RAM 302 is a volatile memory used as a working area for the CPU 301. The flash ROM 303 is a nonvolatile memory for storing programs of the output apparatus 102 and unique information, such as the output apparatus ID of the output apparatus 102.

The wireless communication unit 304 may include a transceiver circuit and an antenna for establishing wireless communication with the gateway 103, for example. The wireless communication unit 304 may establish wireless communication with the gateway 103 using, for example, a wireless LAN, Zigbee (registered trademark), a 920 MHz band specified low-power wireless module (IEEE802.15.4g), or the like.

The sound wave control unit 305 converts information such as the output apparatus ID of the output apparatus 102 stored in the flash ROM 303 or the like into a sound wave signal, and outputs the sound wave signal to the sound wave output unit 306.

In a preferred embodiment, the sound wave control unit 305 converts information such as the output apparatus ID into a sound wave signal having a high frequency of at least 16 kHz of the audio frequency band. Note that the directivity of a sound wave increases as the frequency of the sound wave increases, and at a frequency of 16 kHz or higher, the sound wave would be hardly audible to the human ear. Thus, a sound wave at such a high frequency may be suitable for transmitting information such as the output apparatus ID.

Note that the present invention is not limited to using a particular data transmission method to transmit a sound wave signal. For example, a known modulation scheme, such as FSK (Frequency Shift Keying) or PSK (Phase Shift Keying), may be applied to a sound wave of a predetermined frequency.

The sound wave output unit 306 includes an electroacoustic transducer, such as a speaker, that converts a sound wave signal input from the sound wave control unit 305 into a sound wave and outputs the sound wave.

The bus 307 is connected to the above-described elements of the output apparatus 102 and transmits signals, such as an address signal, a data signal, and various control signals.

(Hardware Configuration of Gateway)

Figure 4:
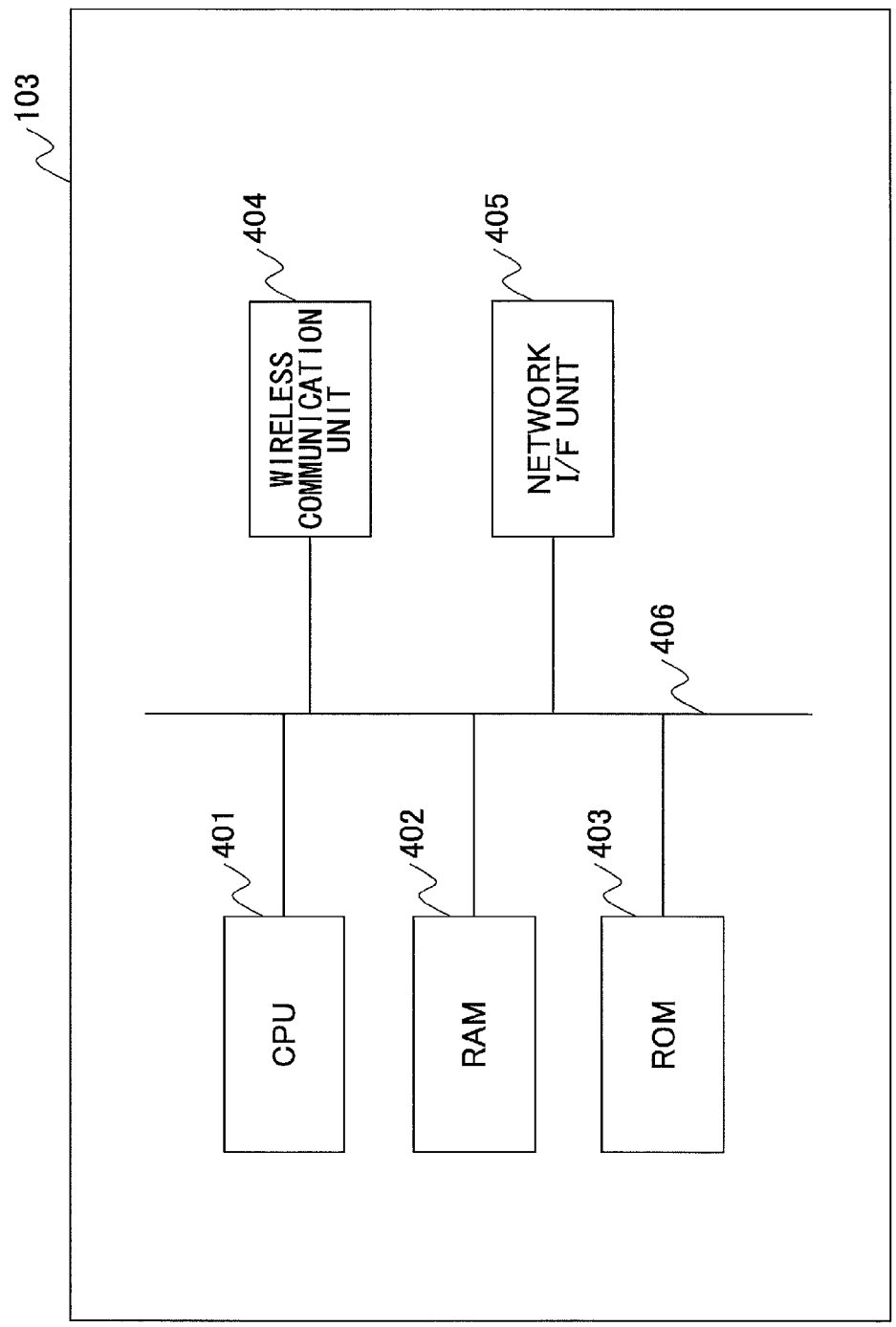
FIG. 4 is a block diagram showing an example hardware configuration of a gateway according to an embodiment of the present invention.

FIG. 4 is a block diagram showing an example hardware configuration of the gateway 103 according to an embodiment of the present invention. In FIG. 4, the gateway 103 includes a CPU 401, a RAM 402, a ROM 403, a wireless communication unit 404, a network I/F unit 405, and a bus 406.

The CPU 401 is an arithmetic unit that executes a program stored in the ROM 403 or the like to implement various functions of the gateway 103. The RAM 402 is a volatile memory used as a working area for the CPU 401. The ROM 403 is a nonvolatile memory that stores a program of the gateway 103 and the like. The ROM 403 may be a rewritable nonvolatile memory, such as a flash ROM or an EEPROM, for example.

The wireless communication unit 404 may include, for example, a wireless circuit and an antenna for establishing wireless communication using the same wireless communication scheme as the wireless communication unit 304 of the output apparatus 102 as described above.

The network I/F unit 405 is a communication interface for connecting the gateway 103 to the network 106.

The bus 406 is connected to the above-described elements of the gateway 103 and transmits signals, such as an address signal, a data signal, and various control signals.

(Hardware Configuration of Information Terminal)

Figure 5:
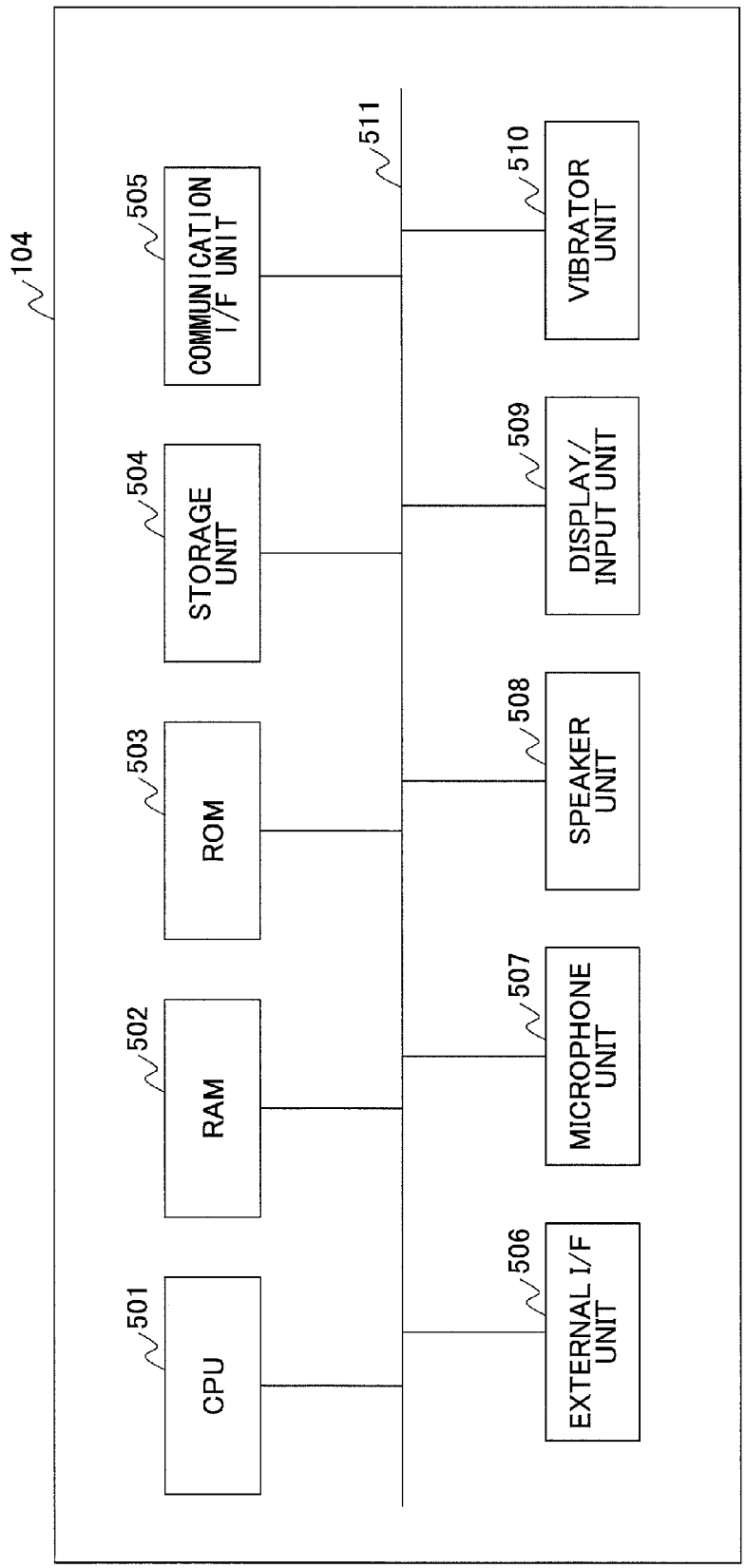
FIG. 5 is a block diagram showing an example hardware configuration of an information terminal according to an embodiment of the present invention.

FIG. 5 is a block diagram showing an example hardware configuration of the information terminal 104 according to an embodiment of the present invention. The information terminal 104 has a general-purpose computer configuration including a CPU 501, a RAM 502, a ROM 503, a storage unit 504, a communication I/F unit 505, an external I/F unit 506, a microphone unit 507, a speaker unit 508, a display/input unit 509, a vibrator unit 510, and a bus 511.

The CPU 501 is an arithmetic unit that loads a program and/or data stored in the ROM 503, the storage unit 504, or the like into the RAM 502, and executes processes to implement various functions of the information terminal 104. The RAM 502 is a volatile memory used as a working area for the CPU 501. The ROM 503 is a nonvolatile memory that is capable of retaining programs and data even when the power is turned off.

The storage unit 504 may be a storage device, such as a HDD, a SSD, a flash ROM, or the like, that stores an OS, application programs, and various types of data.

The communication I/F unit 505 is a communication interface that establishes communication using a mobile communication network, such as 3G (Third Generation) or LTE (Long Term Evolution), or a wireless LAN, for example. The information terminal 104 establishes connection with the network 106 via the communication I/F unit 505 to communicate and exchange data with the management server 101 and the like.

The external I/F unit 506 is an interface with an external device. The external device may include a recording medium, for example. The information terminal 104 may read and/or write data from/on the recording medium via the external I/F unit 506, for example. The recording medium may be a memory card, a USB memory, or the like.

The microphone unit 507 includes an audio pickup device such as a microphone. The microphone unit 507 converts a sound wave acquired by the microphone into an electric signal and further converts the signal into acoustic data in a predetermined format. Note that microphones included in smartphones of recent years have the capability to pick up sound waves of up to 20 kHz, or even 24 kHz in more preferred examples. Thus, if the microphone unit 507 includes such a microphone, it may be able to acquire information that is converted into a high frequency signal of 16 kHz or higher that is included in the sound wave output from the output apparatus 102, for example.

The speaker unit 508 includes an audio (sound wave) output apparatus such as a speaker. The speaker unit 508 converts audio data into an audio signal and further converts the audio signal into a sound wave to be output by the speaker, for example. The display/input unit 509 may include a display device such as a LCD (Liquid Crystal Display) and an input device such as a touch panel, for example. The display/input unit 509 accepts a user input operation by a user and displays a display screen generated by a program executed by the information terminal 104, for example.

The vibrator unit 510 may be a vibration generating unit for notifying a user of an incoming call, an alarm, or reception of information through vibration, for example. The bus 511 is connected to the above-described elements of the information terminal 104 and transmits signals, such as an address signal, a data signal, and various control signals.

Note that the information terminal 104 may install an app that is stored in a recording medium connected to the external I/F unit 506 or downloaded via the communication I/F unit 505 and execute the installed app. For example, the information terminal 104 may download the app for implementing the relevant functions of the information processing system 100 from the management server 101 or the like, and install and execute the downloaded app.

<Functional Configuration>

In the following, an example functional configuration of the information processing system 100 is described.

FIG. 6 is a block diagram showing an example functional configuration of the information processing system 100 according to an embodiment of the present invention. In FIG. 6, the information processing system 100 includes the management server 101, the output apparatus 102, the gateway 103, and the information terminal 104.

(Functional Configuration of Management Server)

The management server (information processing apparatus) 101 includes a communication unit 601, a position information managing unit 602, a registration information managing unit 603, a corresponding information managing unit 604, an event information collecting unit 605, a providing information selecting unit 606, an information providing unit 607, a schedule information managing unit 608, an app providing unit 609, and a storage unit 610.

The communication unit 601 connects the management server 101 to the network 106, and establishes communication with the gateway 103, the information terminal 104, and the like. The communication unit 601 may be implemented by the communication I/F unit 208 and a program executed by the CPU 201 of FIG. 2, for example.

The position information managing unit 602 acquires sender information including sender identification information (identifying the user, the app, or the information terminal 104 sending the sender information) and the own apparatus information of the output apparatus 102 acquired by the information terminal 104 corresponding to the sender of the sender information via the communication unit 601. The own apparatus information of the output apparatus 102 acquired by the sender may include, for example, the output apparatus ID corresponding to identification information of the output apparatus 102 and/or information indicating the installation location (position) of the output apparatus 102. In the following descriptions, it is assumed that the own apparatus information of the output apparatus 102 includes the output apparatus ID of the output apparatus 102.

The position information managing unit 602 also manages position information 611 stored in the storage unit 610. For example, the position information managing unit 602 manages position information of one or more information terminals 104 based on sender information acquired from the one or more information terminals 104. The position information managing unit 602 may be implemented by a program executed by the CPU 201 of FIG. 2, for example.

FIGS. 7A-7C show examples of position information managed by the position information managing unit 602 according to an embodiment of the present invention.

FIG. 7A shows an example of output apparatus position information storing the output apparatus IDs of a plurality of output apparatuses 102 in association with information indicating their corresponding installation locations (positions). Based on such output apparatus position information, the position information managing unit 602 may be able to determine the position of the output apparatuses 102 based on the output apparatus IDs of the output apparatuses 102.

FIG. 7B shows an example of information terminal position information that is managed based on the sender information acquired by the position information managing unit 602 from one or more information terminals 104. Note that in FIG. 7B, "sender ID (app ID)" corresponds to the sender identification information (e.g. app ID) included in the sender information acquired by the position information managing unit 602. "Output apparatus ID" corresponds to the output apparatus ID of the output apparatus 102 included in the acquired sender information. "Position" is information indicating the position of the output apparatus 102 identified by the output apparatus ID and the position of the information terminal 104. The position of the output apparatus 102 and the information terminal 104 may be determined based on the output apparatus position information shown in FIG. 7A and the output apparatus ID included in the sender information acquired from the information terminal 104. "Acquisition date/time" may be information indicating the date/time the position information managing unit 602 acquired the sender information, for example.

FIG. 7C shows an example of floor information indicating the layout of the building 107 or the like and installation locations of the output apparatuses 102 (points 1-9).

Based on the position information as described above, the position information managing unit 602 may be able to determine and manage the position of each information terminal 104. For example, it can be determined based on the information terminal position information shown in FIG. 7B that the information terminal 104 that runs an app with the app ID "AP0002" is located at point 1. Also, it can be determined based on the floor information shown in FIG. 7C that point 1 is close to exit A.

Referring back to FIG. 6, the other functional elements of the management server 101 are described.

The registration information managing unit 603 stores and manages identification information of the user of each information terminal 104 (e.g. app ID) in association with registration information of the information terminal 104 (e.g. user information of the user) as registration information 612 in the storage unit 610. The registration information managing unit 603 may be implemented by a program executed by the CPU 201 of FIG. 2, for example.

FIG. 8 shows an example of the registration information 612 managed by the registration information managing unit 603 according to an embodiment of the present invention.

In the example shown in FIG. 8, the registration information 612 includes a user ID (app ID), a registration date/time, and user information.

Note that, the "user ID (app ID)" is information identifying the information terminal 104 (or the user of the information terminal 104), and may be an app ID, identification information of the information terminal 104, or identification information of the user, for example. In the example of FIG. 8, the app ID of the app run on the information terminal 104 is registered as the "user ID (app ID)". The "registration date/time" is information indicating the date/time the user information was registered in association with the app ID. The "user information" may include information on the user, such as information indicating a classification of the user that is pre-registered by an administrator of the management server 101 or the like (e.g., disaster prevention staff member, general employee, etc.) and/or user information registered by the user through operation of an app of the information terminal 104, for example.

Note that the user information registered in the registration information 612 of FIG. 8, such as "disaster prevention staff member" and "employee" are examples of user classification information pre-registered by the administrator of the management server 101 or the like.

Also, the user may be able to register the user information upon installing an app in the information terminal 104 and registering (signing up) to use the app, for example. Note that the user information registered in the registration information 612 of FIG. 8, such as "general customer", "elderly", and "visually impaired" are examples of user information registered by the user.

Referring back to FIG. 6, the other functional elements of the management server 101 are described.

The corresponding information managing unit 604 stores and manages corresponding information 613 in the storage unit 610. The corresponding information 613 stores information relating to the position of each output apparatus 102 and corresponding providing information to be provided in association with a predetermined event. The corresponding information managing unit 604 may be implemented by a program executed by the CPU 201 of FIG. 2, for example.

FIGS. 9A-10B show examples of the corresponding information 613 managed by the corresponding information managing unit 604 according to an embodiment of the present invention.

FIG. 9A is a table showing an example of the corresponding information 613 for general customers. Note that general customers may include users that are registered as "general customer" in the registration information 612 of FIG. 8 and users that are not registered, for example. In the example corresponding information 613 of FIG. 9A, information items including "output apparatus ID", "position", and "providing information" are stored in association with each "event".

Note that in the present example, it is assumed that the corresponding information 613 is set up in advance by an administrator of the management server 101 or the like. For example, the corresponding information managing unit 604 may cause a web browser of a PC or the information terminal 104 used by the administrator to display a registration web page for registering the corresponding information 613, and store the corresponding information 613 has been registered via the registration web page in the storage unit 610. Alternatively, the corresponding information managing unit 604 may receive the corresponding information 613 that has been registered via an app run on the PC or the information terminal 104 of the administrator and store the received corresponding information 613 in the storage unit 610, for example.

Note that the "event" of the corresponding information 613 is information indicating a predetermined event. For example, the predetermined event may include disasters, such as a fire, an earthquake, and the like, and transportation delays, such as a train delay, a traffic jam, and the like. Further, other various events may be registered as the "event" in the corresponding information 613 including, for example, detecting a user at a predetermined location (position) and/or reaching a specified time for a specific event, for example.

Note that the "output apparatus ID" of corresponding information 613 corresponds to the "output apparatus ID" of FIG. 7. Also, the "position" of corresponding information 613 corresponds to the "position" of FIG. 7 and indicates the installation location (position) of the output apparatus 102. The "output apparatus ID" and the "position" of the corresponding information 613 are examples of information relating to the position of the output apparatus 102.

The "providing information" of the corresponding information 613 is information indicating the information to be provided to each information terminal 104 that is located in the vicinity of each "position" when the "event" is occurring. For example, according to FIG. 9A, when a fire (as an example of the "event") is occurring, "route information to exit A" is provided to an information terminal 104 located at point 1 (as an example of the "position"). Note that although the corresponding information shown in FIG. 9A merely includes a general description of the providing information, in other examples, the providing information stored in the corresponding information 613 may include information items, such as an image or audio, to be provided to the user or the information terminal 104.

FIG. 9B is a table showing an example of the corresponding information 613 for disaster prevention staff members. As shown in FIGS. 9A and 9B, the corresponding information managing unit 604 preferably manages plural sets of the corresponding information 613 based on the user information registered in the registration information 612 as shown in FIG. 8, for example.

Note that in the corresponding information 613 for disaster prevention staff members as shown in FIG. 9B, certain predetermined events, such as "detection at point 6", included in the "event" of the corresponding information 613 for general customers as shown in FIG. 9A are omitted. In this way, at least a part of the predetermined events included in the "event" of the corresponding information 613 may be altered according to the type of user being addressed, based on the user information registered in the registration information 612, for example.

Also, even when the corresponding information 613 for disaster prevention staff members includes an "event" that is the same as that included in the corresponding information 613 for general customers, the corresponding "providing information" stored in association with the "event" may be different. For example, according to FIGS. 9A and 9B, when a fire occurs, "route information to exit A" is provided to a user corresponding to a general customer that is at point 1, whereas "route information to fire outbreak location" is provided to a user corresponding to a disaster prevention staff member that is at point 1.

Note that the "route information to fire outbreak location" is only one example of the providing information to be provided to a disaster prevention staff member. That is, other various types of information differing from that provided to a general customer may be provided to a disaster staff member, such as information on initial response to the fire, or information for guiding evacuating persons, for example.

FIG. 10A is a table showing an example of the corresponding information 613 for employees. Note that the "event" portion of the corresponding information 613 for employees shown in FIG. 10A is the same as the "event" portion of the corresponding information 613 for disaster prevention staff members as shown in FIG. 9B. However, the corresponding "providing information" stored in association with the predetermined events included in the "event" may differ from that of the corresponding information 613 for disaster prevention staff members. For example, when a fire occurs, "evacuation guidance information to exit A" is provided to a user corresponding to an employee at point 1. Note that the "evacuation guidance information to exit A" is merely one example of the providing information that can be provided to an employee, and other various types of information differing from that provided to a general customer or a disaster prevention staff member may be provided to an employee.

FIG. 10B is a table showing an example of the corresponding information 613 for the visually impaired. Note that the "event" portion of the corresponding information 613 for the visually impaired as shown in FIG. 10B is the same as the "event" portion of the corresponding information 613 for general customers as shown in FIG. 9A. However, the "providing information" stored in association with the predetermined events included in the "event" may differ from the corresponding information 613 for general customers. For example, the providing information may be provided to the visually impaired in the form of an audible sound (audio). The audible sound to be provided may be output by the output apparatus 102, or the audible sound may be output by the information terminal 104, for example. Note that the corresponding information 613 for the visually impaired is merely one example of the corresponding information 613 for a specific type of users. Other examples of the corresponding information 613 include corresponding information for the elderly, corresponding information for children, corresponding information in various different languages for people from different countries, and the like.

As described above, the corresponding information managing unit 604 preferably manages a plurality of sets of corresponding information 613 based on the user information registered in the registration information 612 of FIG. 8, for example.

Referring back to FIG. 6, the other functional elements of the management server 101 are described.

The event information collecting unit 605 collects event information of a predetermined event that is occurring. The event information collecting unit 605 may be implemented by a program executed by the CPU 201 of FIG. 2, for example. Note that the predetermined event may correspond to one of the predetermined events (e.g., "fire" or "earthquake") registered in the "event" of the corresponding information 613 shown in FIGS. 9A-10B, for example. The event information collecting unit 605 collects event information relating to the predetermined event that is currently occurring.

For example, in a case where a disaster, such as a fire or an earthquake occurs in the building 107, disaster notification information may be communicated to the administrator of the management server 101 from a fire detector or a disaster control center, for example. In such case, the administrator may operate the management server 101 to input disaster information, and in this way, the event information collecting unit 605 may acquire event information indicating that a disaster is occurring, for example.

Alternatively, the event information indicating that a disaster is occurring may be communicated to the event information collecting unit 605 via a network from an information terminal 104 of a disaster prevention staff member or a server provided at a disaster control center, for example.

The event information collecting unit 605 may collect event information, such as transportation delay information, by accepting input operations made by the administrator of the management server 101, or receiving the event information from a server providing transportation information via the network 106, for example.

Also, the event information collecting unit 605 may collect event information indicating that an information terminal 104 has been detected at a predetermined location (position) from the position information managing unit 602, for example.

Further, the event information collecting unit 605 may collect event information indicating an upcoming pre-scheduled event, such as a special event or the departure of the last train, from the schedule information managing unit 608, for example.

The providing information selecting unit 606 selects (determines) providing information to be provided to a sender of sender information from among the different providing information stored in the corresponding information 613, based on the sender information acquired by the position information managing unit 602 and the event information collected by the event information collecting unit 605. The providing information selecting unit 606 may be implemented by a program executed by the CPU 201 of FIG. 2, for example.

For example, with reference to FIG. 9A, when a fire occurs, if the output apparatus ID "SP0002" is included in the sender information acquired from the information terminal 104 of a general customer, "route information to Exit B" is selected as the providing information to be provided to the information terminal 104 corresponding to the sender of the sender information.

Note that in a case where a plurality of events are occurring at the same time, the providing information selecting unit 606 preferably selects the event with the highest priority (e.g., disaster such as a fire or an earthquake) and selects the providing information corresponding to the selected event. Alternatively, when a plurality of events are occurring at the same time, the providing information selecting unit 606 may be configured to select a plurality of sets of providing information.

The information providing unit 607 provides the providing information that has been selected by the providing information selecting unit 606 to the information terminal 104 corresponding to the sender of the sender information. The information providing unit 607 may be implemented by a program executed by the CPU 201 of FIG. 2, for example.

For example, the app run on the information terminal 104 for implementing the information processing system 100 may be a web-based app, and the information providing unit 607 may send the providing information to the app that is run on the information terminal 104 based on the app ID of the app.

Alternatively, the information providing unit 607 may send an output request to the output apparatus 102 via the gateway 103 to have the output apparatus 102 output the providing information, for example. In such case, the app ID of the app run on the information terminal 104 may be included in the providing information output by the output apparatus 102 such that the app run on the information terminal 104 may selectively acquire the providing information that includes the app ID of the app.

The schedule information managing unit 608 manages schedule information of a predetermined event, such as the schedule of a special event, the departure time of the last train, the closing time of a store, and the like. The schedule information managing unit 608 may be implemented by a program executed by the CPU 201 of FIG. 2, for example.

The app providing unit 609 provides the app for the information terminal 104 for implementing the information processing system 100 to the information terminal 104. The app providing unit 609 may be implemented by a program executed by the CPU 201 of FIG. 2, for example.

(Functional Configuration of Output Apparatus)

The output apparatus 102 includes a wireless communication unit 621, a sound wave output unit 622, and an apparatus information storage unit 623.

The wireless communication unit 621 establishes wireless communication with the gateway 103. The wireless communication unit 621 may be implemented by the wireless communication unit 304 and a program executed on the CPU 301 of FIG. 3, for example. The wireless communication unit 621 enables the output apparatus 102 to exchange data with the management server 101 via the gateway 103.

The sound wave output unit 622 outputs a sound wave including own apparatus information of the output apparatus 102 (e.g., output apparatus ID and position information of the output apparatus 102). In the following descriptions, it is assumed that the own apparatus information of the output apparatus 102 includes the output apparatus ID of the output apparatus 102. Note that the sound wave output unit 622 may be implemented by the sound wave control unit 305, the sound wave output unit 306, and a program executed by the CPU 301 of FIG. 3, for example.

Also, the sound wave output unit 622 may be capable of outputting providing information in the form of a sound wave (inaudible sound) or providing information in the form of an audible sound in response to an instruction from the management server 101, for example.

The apparatus information storage unit 623 stores output apparatus information, such as the output apparatus ID to be included in the sound wave to be output by the sound wave output unit 622 and/or the position information of the output apparatus 102. The apparatus information storage unit 623 may be implemented by the flash ROM 303 of FIG. 3, for example.

Note that the apparatus information, such as the output apparatus ID, stored in the apparatus information storage unit 623 may correspond to pre-set information stored in the output apparatus 102, or information designated by the management server 101, for example.

(Functional Configuration of Information Terminal)

The information terminal 104 includes a communication unit 631, a sound wave acquiring unit 632, an information extracting unit 633, an identification information transmitting unit 634, an identification information storage unit 635, a providing information receiving unit 636, a display control unit 637, a display/input unit 638, an audio output unit 639, and a vibration generating unit 640.

The communication unit 631 connects the information terminal 104 to the network 106, and enables the information terminal 104 to exchange data with the management server 101 or the like. The communication unit 631 may be implemented by the communication I/F unit 505 and a program executed on the CPU 501 of FIG. 5, for example.

The sound wave acquiring unit 632 acquires the sound wave output from the output apparatus 102. The sound wave acquiring unit 632 may be implemented by the microphone unit 507 and a program executed by the CPU 501 of FIG. 5, for example.

The information extracting unit 633 extracts information included in the sound wave acquired by the sound wave acquiring unit 632. The information extracting unit 633 may be implemented by a program executed by the CPU 501 of FIG. 5, for example. The information extracting unit 633 may extract information, such as the output apparatus ID of the output apparatus 102 and/or providing information included in the sound wave acquired by the sound wave acquiring unit 632, for example.

Also, in a preferred embodiment, when the providing information included in the sound wave acquired by the sound wave acquiring unit 632 includes the app ID of the app run on the information terminal 104, the information extracting unit 633 sends the extracted providing information to the providing information receiving unit 636.

Note that the app ID is one example of sender identification information identifying the information terminal 104 corresponding to the sender of sender information. Other examples of sender identification information that may be used include identification information of the information terminal 104 (e.g., telephone number) and identification information of the user (e.g., email address).

The identification information transmitting unit 634 transmits sender identification information (e.g., app ID) that is stored in the identification information storage unit 635 and the output apparatus ID of the output apparatus 102 extracted by the information extracting unit 633 to the management server 101 via the communication unit 631. The identification information transmitting unit 634 may be implemented by a program executed by the CPU 501 of FIG. 5, for example.

The identification information storage unit 635 stores sender identification information, such as the app ID of the app that is run on the information terminal 104 corresponding to the sender of sender information. The app ID may correspond to app identification information that is generated by the app run on the information terminal 104 for implementing the information processing system 100 when the app is first installed in the information terminal 104, for example. The app run on the information terminal 104 may generate a unique app ID with respect to each information terminal 104 based on unique identity information of the information terminal 104, such as the IMEI (International Mobile Equipment Identity), for example. Alternatively, the app ID may correspond to a unique app ID that is assigned to the app run on the information terminal 104 when the app is downloaded from the app providing unit 609 of the management server 101, for example. Note that the app ID may also be generate in other various ways.

The providing information receiving unit 636 may receive the providing information from the management server 101 via the communication unit 631, for example. Alternatively, the providing information receiving unit 636 may receive the providing information from the information extracting unit 633, for example. The providing information receiving unit 636 may be implemented by a program executed by the CPU 501 of FIG. 5, for example.

The display control unit 637 controls the display/input unit 638 to display a display screen based on the providing information received by the providing information receiving unit 636. The display control unit 637 may be implemented by a program executed by the CPU 501 of FIG. 5, for example.

The display/input unit 638 displays a display screen based on the received providing information, under the control of the display control unit 637, for example, and accepts input operations from the user. The display input unit 638 may be implemented by the display input unit 509 of FIG. 5, for example.

The audio output unit 639 outputs audio based on the received providing information in the case where the providing information received by the providing information receiving unit 636 includes an audible sound or and output instruction to output an audible sound, for example. The audio output unit 639 may be implemented by the speaker unit 508 and a program executed by the CPU 501 of FIG. 5, for example.

The vibration generating unit 640 outputs a vibration based on the received providing information in a case where the providing information received by the providing information receiving unit 636 includes an instruction to output a vibration, for example.

<Processing Flow>

In the following, example process operations of the information processing system 100 are described.

First Embodiment

In the following, process operations according to a first embodiment of the present invention are described. First, a process in which the information providing unit 607 of the management server 101 sends the providing information selected by the providing information selecting unit 606 to the information terminal 104 via the communication unit 601 is described.

Figure 11:
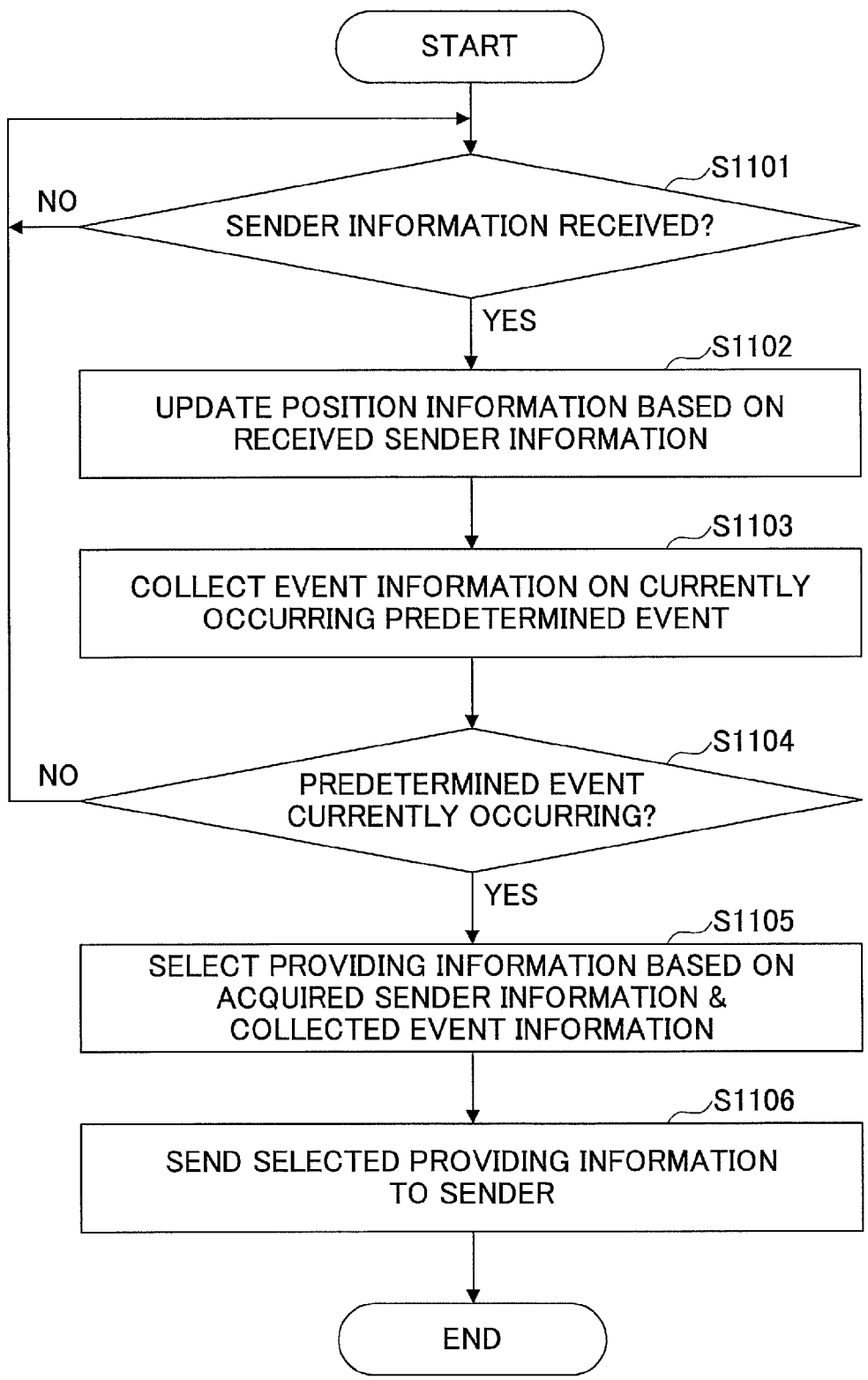
FIG. 11 is a flowchart showing a process operation implemented by the management server according to an embodiment of the present invention.

FIG. 11 is a flowchart illustrating an example process operation of the management server 101 according to the first embodiment.

In step S1101, the management server 101 determines whether it has received sender information from an information terminal 104. If sender information has been received (YES in step S1101), the management server 101 executes step S1102 and the subsequent process steps.

In step S1102, the position information managing unit 602 of the management server 101 acquires the sender information received by the communication unit 601. The sender information may include an app ID of an app that is run on the sender information terminal 104 (as an example of sender identification information) and an output apparatus ID that has been acquired by the app run on the sender information terminal 104 (as an example of own apparatus information of the output apparatus 102), for example.

Based on the acquired sender information, the position information managing unit 602 may update the information terminal position information shown in FIG. 7B, for example. Note that the "position" information to be stored in the information terminal position information of FIG. 7B may be determined based on the output apparatus position information shown in FIG. 7A and the output apparatus ID included in the acquired sender information, for example. Also, the date/time the position information managing unit 602 acquired the sender information may be stored as the "acquisition date/time" of the information terminal position information of FIG. 7B, for example.

In step S1103, the event information collecting unit 605 of the management server 101 collects event information of a predetermined event that is occurring.

In step S1104, the event information collecting unit 605 of the management server 101 determines whether there is a predetermined event that is currently occurring. If no predetermined event is currently occurring, the management server 101 returns to step S1101 and repeats the same process. On the other hand, if there is a predetermined event that is currently occurring, the management server 101 proceeds to step S1105.

Upon proceeding to step S1105, the providing information selecting unit 606 of the management server 101 selects providing information to be provided to the sender of the sender information (the sender information terminal 104) based on the sender information acquired by the position information managing unit 602 and the event information collected by the event information collecting unit 605.

For example, the providing information selecting unit 606 of the management server 101 may acquire corresponding user information associated with the app ID included in the sender information from the registration information 612 shown in FIG. 8, and select the corresponding information 613 for the corresponding user information.

As one example, assuming the corresponding information 613 for general customers as shown in FIG. 9A is selected, the providing information to be provided to the sender may be determined (selected) based on the output apparatus ID included in the acquired sender information and the event information indicating the predetermined event that is currently occurring.

For example, if the output apparatus ID "SP0002" is included in the sender information, and "fire" is the predetermined event that is currently occurring, "route information to exit B" may be selected as the providing information to be provided to the sender.

As another example, if the corresponding information 613 for disaster prevention staff members as shown in FIG. 9B is selected, the output apparatus ID "SP0002" is included in the sender information, and "fire" is the predetermined event that is currently occurring, "route information to fire outbreak location" may be selected as the providing information to be provided to the sender.

In step S1106, the information providing unit 607 of the management server 101 sends the providing information selected by the providing information selecting unit 606 to the app of the sender information terminal 104 based on the app ID included in the sender information.

In the following, an overall process flow of the information processing system 100 according to the first embodiment is described.

Figure 12:
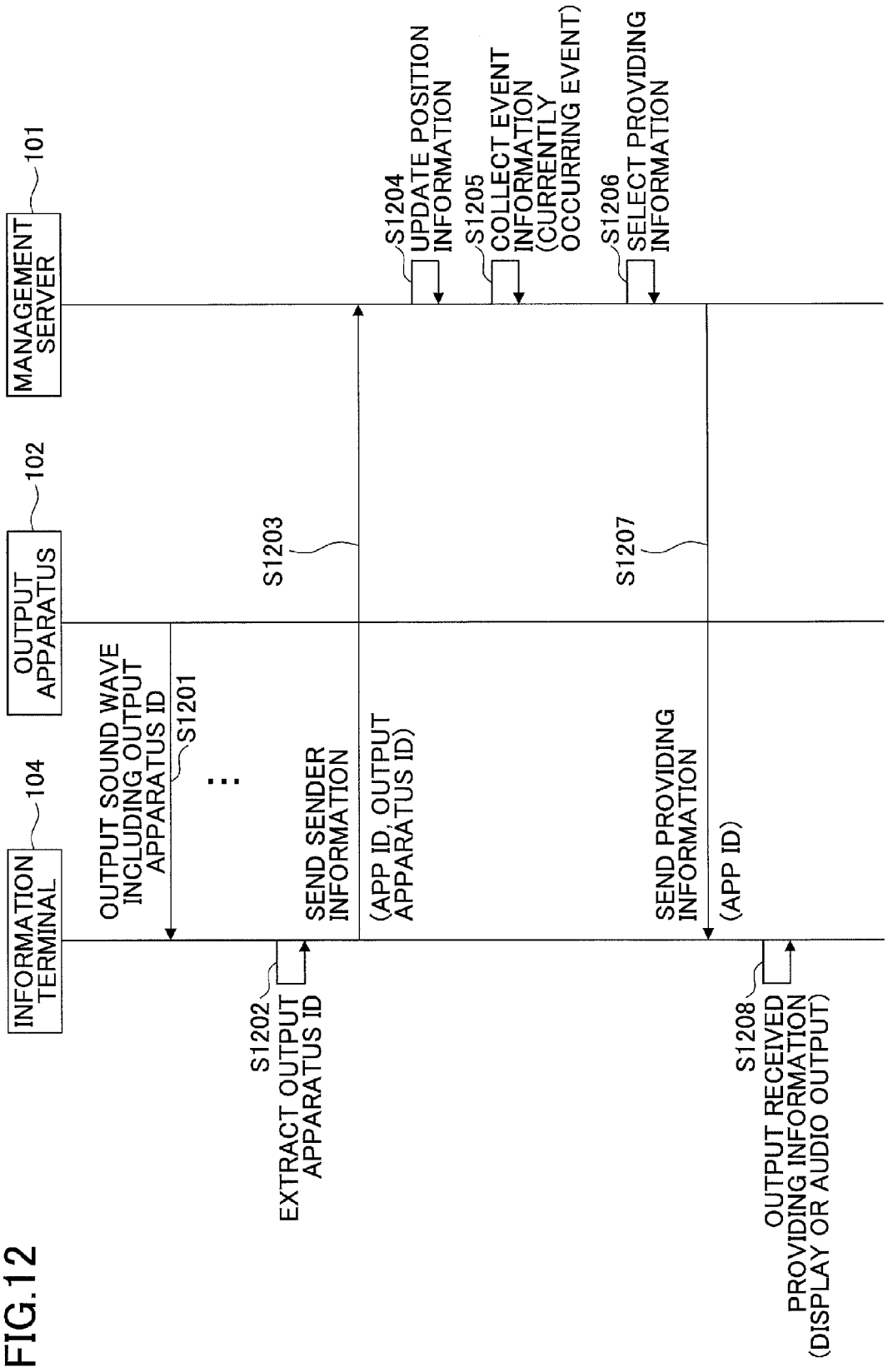
FIG. 12 is a sequence chart showing an example overall process operation of the information processing system.

FIG. 12 is a sequence chart showing an example process operation of the information processing system 100 according to the first embodiment.

In step S1201, the output apparatus 102 outputs a sound wave including the output apparatus ID of the output apparatus 102 (as an example of own apparatus information of the output apparatus 102). Note that in the present embodiment, it is assumed that the output apparatus 102 continuously outputs a sound wave including the output apparatus ID of the output apparatus 102.

In step S1202, the sound wave acquiring unit 632 of the information terminal 104 acquires the sound wave output from the output apparatus 102, and the information extracting unit 633 extracts the output apparatus ID included in the acquired sound wave.

In step S1203, the identification information transmitting unit 634 of the information terminal 104 transmits sender information including the output apparatus ID extracted by the information extracting unit 633 and the app ID of the app run on the information terminal 104 to the management server 101 via the communication unit 631.

In step S1204, the position information managing unit 602 of the management server 101 acquires the sender information transmitted from the information terminal 104, and updates the information terminal position information of the information terminal 104 (app). Note that the process of step S1204 corresponds to the process of step S1102 of FIG. 11.

In step S1205, the event information collecting unit 605 of the management server 101 determines whether there is a predetermined event that is currently occurring by collecting event information. If there is a predetermined event that is currently occurring, the processes of step S1206 and the subsequent steps are executed. Note that the process of step S1205 corresponds to the processes of steps S1103 and S1104 of FIG. 11.

Upon proceeding to step S1206, the providing information selecting unit 606 of the management server 101 selects the providing information to be provided to the sender of the sender information. Note that the process of step S1206 corresponds to the process of step S1105 of FIG. 11.

In step S1207, the information providing unit 607 of the management server 101 sends the providing information selected by the providing information selecting unit 606 to the information terminal 104, based on the app ID included in the sender information from the information terminal 104. In step S1208, the providing information receiving unit 636 of the information terminal 104 receives the providing information from the management server 101, and the display control unit 637 outputs a display screen based on the received providing information to the display/input unit 638.

Note that in the case where the received providing information includes an audible sound or an instruction to output an audible sound, the audio output unit 639 outputs the providing information in the form of an audible sound.

Also, in the case where the received providing information includes ah instruction to output a vibration, the vibration generating unit 640 outputs the providing information as a vibration.

FIGS. 15-17B show examples of display screens displaying the providing information provided by the management server 101 that may be displayed on the information terminal 104 in step S1208.

Figure 15:
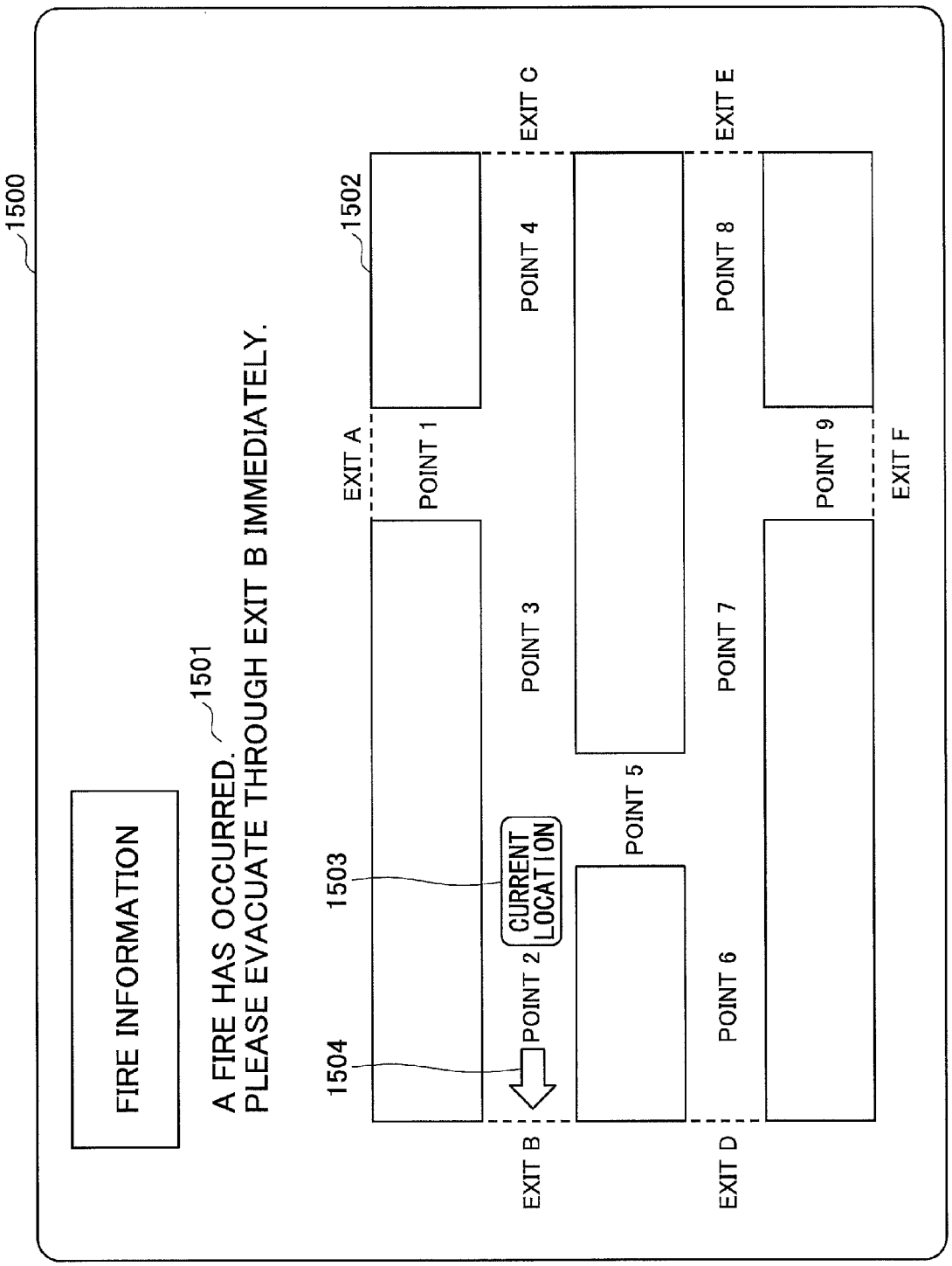
FIG. 15 shows an example of a display screen to be provided to a general customer according to an embodiment of the present invention.

FIG. 15 shows an example of a display screen displaying providing information to be provided to a general customer according to an embodiment of the present invention. The display screen 1500 shown in FIG. 15 is an example of a display screen to be provided to a general customer that is located at point 2 when a fire occurs. For example, according to the corresponding information 613 for general customers shown in FIG. 9A, when a "fire" occurs, "route information to exit B" is to be provided as the providing information to a general customer that is located at the position "point 2".

In the example of FIG. 15, a message 1501 prompting the user (corresponding to a general customer) to evacuate through exit B is displayed on the display screen 1500.

Also, the display screen 1500 preferably displays a floor map 1502 of the building 107. In this way, the user may be able to grasp the positional relationship between his/her current location and the exit B.

Further, the display screen 1500 preferably displays a current location 1503 and an arrow 1504 or the like indicating an evacuating direction.

Note that images representing items, such as the floor map 1502, the current location 1503, and the arrow 1504 may be generated by the information providing unit 607 based on the position information 611 (see FIG. 7) managed by the position information managing unit 602, for example.

Note that the display screen 1500 shown in FIG. 15 is merely one example. That is, other various forms of display screens may be provided to a general customer for prompting the general customer to evacuate through the nearest exit (e.g. exit B) when a fire occurs.

Figure 16:
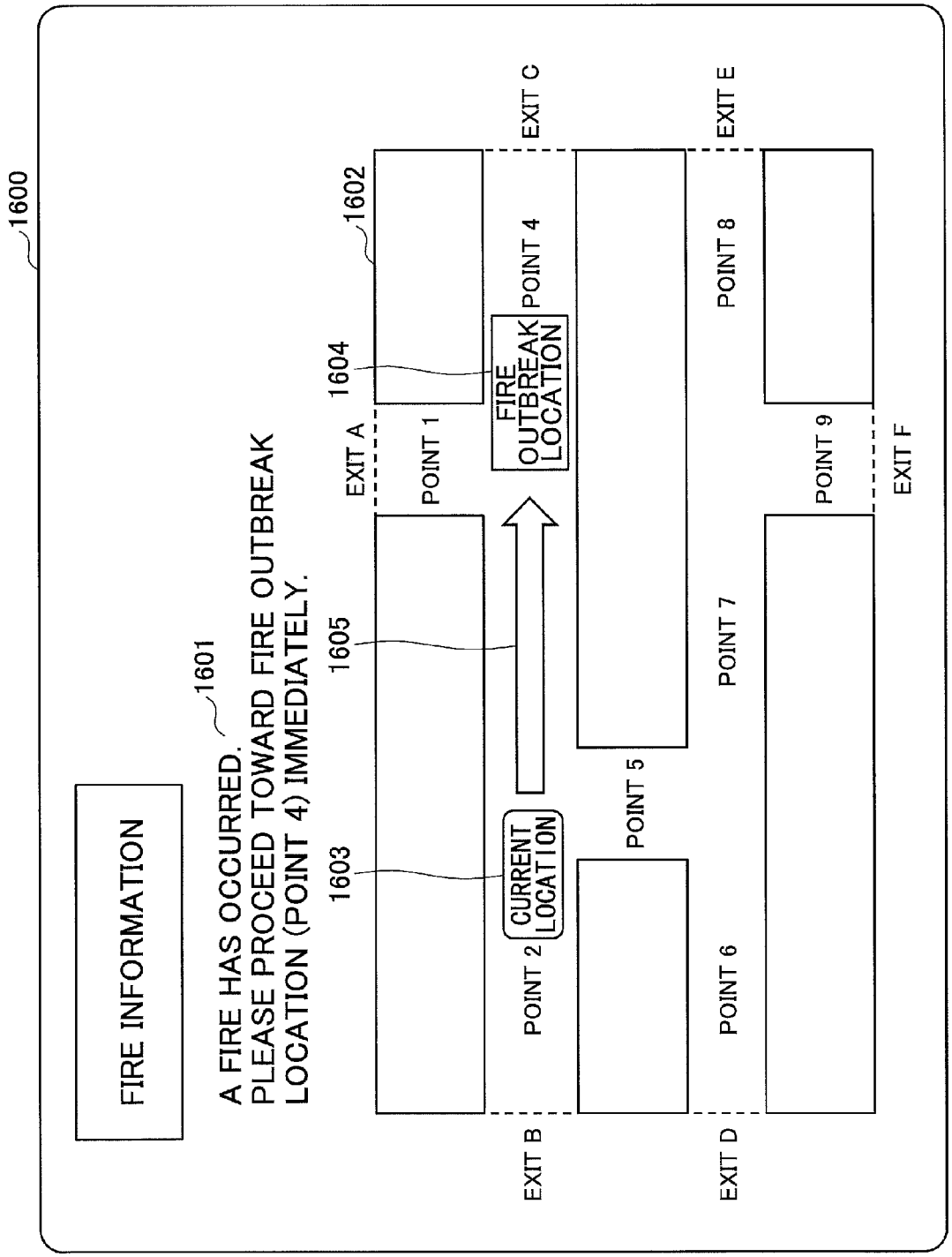
FIG. 16 shows an example of a display screen to be provided to a disaster prevention staff member according to an embodiment of the present invention.

FIG. 16 shows an example of a display screen to be provided to a disaster prevention staff member according to an embodiment of the present invention. The display screen 1600 shown in FIG. 16 is an example of a display screen to be provided to a disaster prevention staff member that is located at point 2 when a fire occurs. For example, according to the corresponding information 613 for disaster prevention staff members shown in FIG. 9B, when a "fire" occurs, "route information to fire outbreak location" is to be provided as the providing information to a disaster prevention staff member located at the position "point 2".

In the example of FIG. 16, the display screen 1600 displays a message 1601 prompting the user (corresponding to a disaster prevention staff member) to move toward the fire outbreak location. Note that if the fire outbreak location is not yet specified, for example, a message stating "fire outbreak location is currently being confirmed" or the like may be displayed.

Also, the display screen 1600 preferably displays a floor map 1602 of the building 107. In this way, the disaster prevention staff member may be able to grasp the positional relationship between his/her current location and the fire outbreak location (point 4).

Further, the display screen 1600 preferably displays a current location 1603, a fire outbreak location 1604, and an arrow 1605 indicating a route to the fire outbreak location.

Note that images of items, such as the floor map 1602, the current location 1603, the fire outbreak location 1604, and the arrow 1605 indicating the route to the fire outbreak location may be generated by the information providing unit 607 based on the position information 611 (see FIG. 7) and/or event information collected by the event information collecting unit 605, for example.

Also, note that the display screen 1600 shown in FIG. 16 is merely one example. That is, other various forms of display screens may be provided to a disaster staff member for notifying the disaster prevention staff member of a fire outbreak location and other relevant information when a fire occurs.

In the following, examples of display screens that are provided according to the position of the user are described.

Figure 17B:
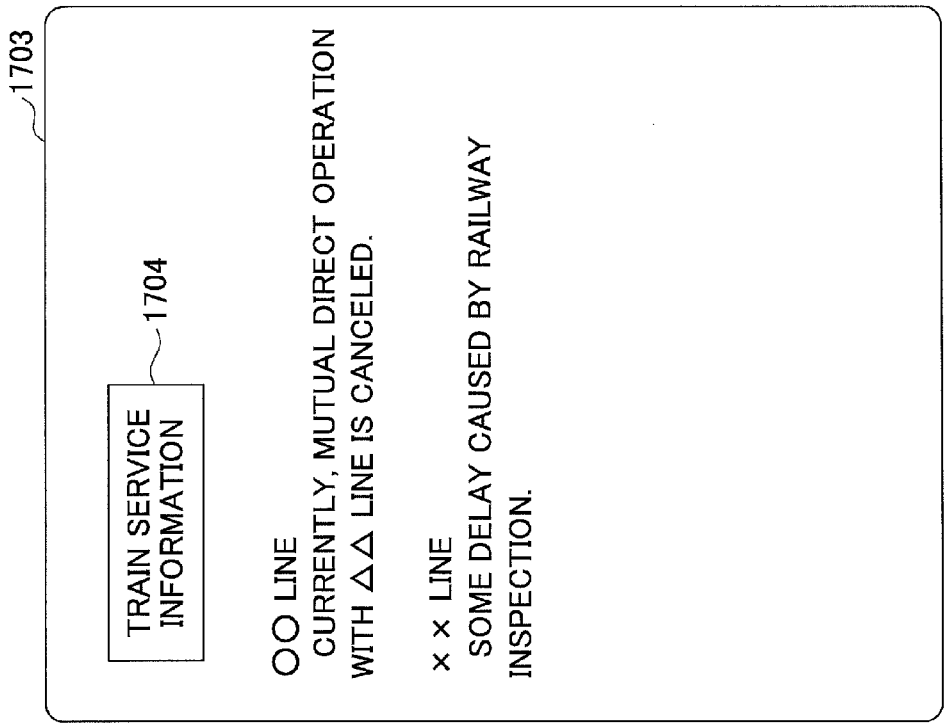
FIGS. 17A and 17B show examples of display screens to be provided according to the position of a user.
Figure 17A:
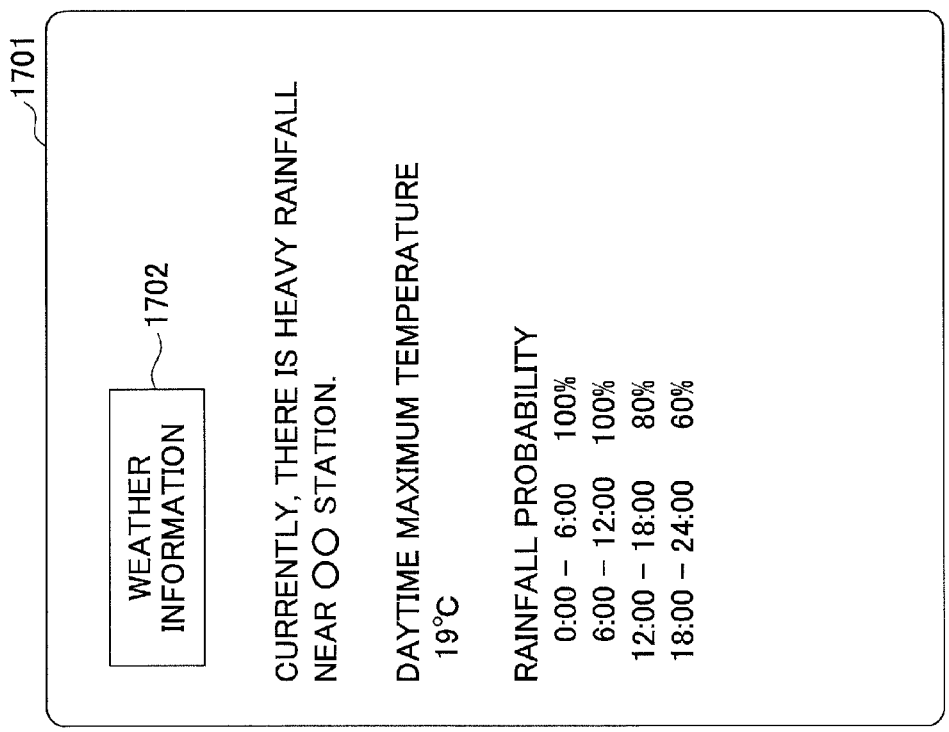

FIGS. 17A and 17B show examples of display screens that are provided according to the position of the user according to embodiments of the present invention.

FIG. 17A shows an example of a display screen to be provided in a case where an information terminal 104 (app) is detected at point 6. For example, according to the corresponding information 613 for general customers shown in FIG. 9A, when the event "detection at the point 6" occurs, "weather information" is to be provided as the providing information to the user detected at point 6 corresponding to a general customer.

The display screen 1701 shown in FIG. 17A displays weather information 1702. The weather information 1702 may be acquired by the information providing unit 607 from an external weather information providing service that provides weather information over the network 106, for example. Alternatively, the weather information 1702 may be set up by the administrator of the management server 101 or the like, for example.

FIG. 17B shows an example of a display screen to be provided in a case where an information terminal 104 (app) is detected at point 8. For example, according to the corresponding information 613 for general customers shown in FIG. 9A, when the event "detection at point 8" occurs, "train service information" is provided as the providing information to a general customer detected at "point 8".

The display screen 1703 shown in FIG. 17B displays train service information 1704. The train service information 1704 may be acquired by the information providing unit 607 from an external train service information providing service that provides train service information over the network 106, for example. Alternatively, the train operation information 1704 may be set up by the administrator of the management server 101 or the like, for example.

Note that according to the corresponding information 613 for disaster prevention staff members and employees shown in FIGS. 9B and 10A, the weather information and the train service information as shown in FIGS. 17A and 17B are not provided to disaster prevention staff members and employees. In this way, for example, information such as weather information and train service information may be prevented from being repeatedly provided to disaster prevention staff members and employees that are expected to be inside the building 107 for a long period of time.

Also, according to the corresponding information 613 for the visually impaired shown in FIG. 10B, when the event "detection at point 8" occurs, "train service information by audible sound" is to be provided as the providing information to a visually impaired person that is detected at "point 8". In this case, for example, the information terminal 104 may output the train service information by audible sound that is included in the providing information provided by the management server 101 from the audio output unit 639.

As described above, in the information processing system 100 according to the present embodiment, an information processing apparatus (e.g., management server 10) that provides information according to a currently occurring event may be able to provide suitable information to each individual user.

Second Embodiment

In the following, a second embodiment of the present invention is described. First, a process according to the second embodiment in which the information providing unit 607 of the management server 101 conveys the providing information selected by the providing information selecting unit 606 to the information terminal 104 via the communication unit 601 is described. Note that the following descriptions mainly relate to process operations that vary from those of the first embodiment.

Figure 13:
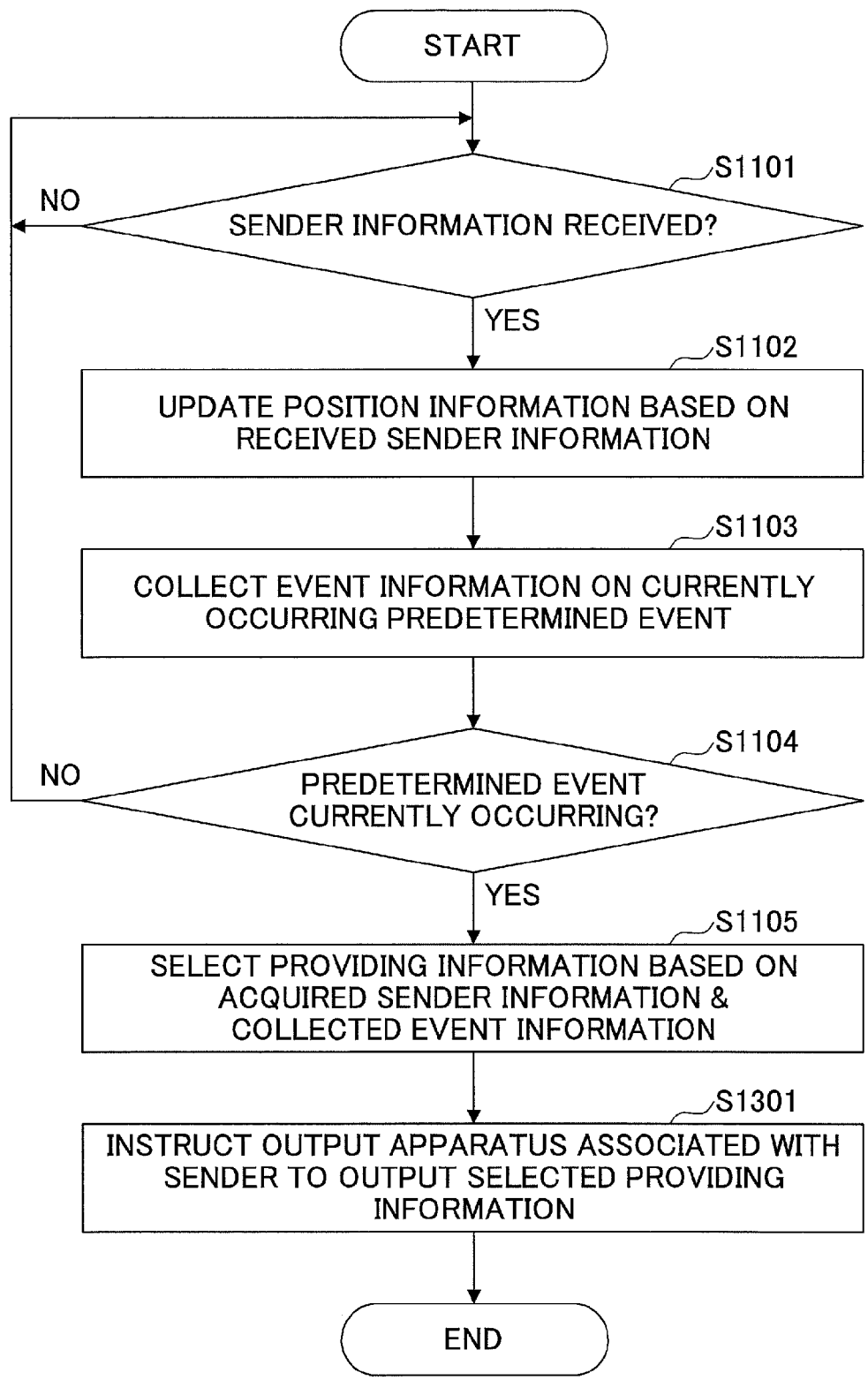
FIG. 13 is a flowchart showing an example process operation implemented by the management server according to another embodiment of the present invention.

FIG. 13 is a flowchart showing an example process operation of the management server 101 according to the second embodiment. Note that the processes of steps S1101-S1105 of FIG. 13 are substantially identical to the processes of steps S1101-S1105 of the first embodiment as shown in FIG. 11.

In step S1301, the information providing unit 607 of the management server 101 according to the present embodiment instructs the output apparatus 102 associated with the sender information terminal 104 to output of the providing information selected by the providing information selecting unit 606. Note that the output apparatus 102 associated with the sender information terminal 104 may be the output apparatus 102 identified by the output apparatus ID included in the sender information from the sender information terminal 104, for example. Alternatively, the output apparatus 102 associated with the sender information terminal 104 may be the output apparatus 102 that is located at the position of the sender information terminal 104 (app), which position can be determined based on the information terminal position information (see FIG. 7B) managed by the position information managing unit 602, for example.

In the following, an overall process operation of the information processing system 100 according to the second embodiment is described.

Figure 14:
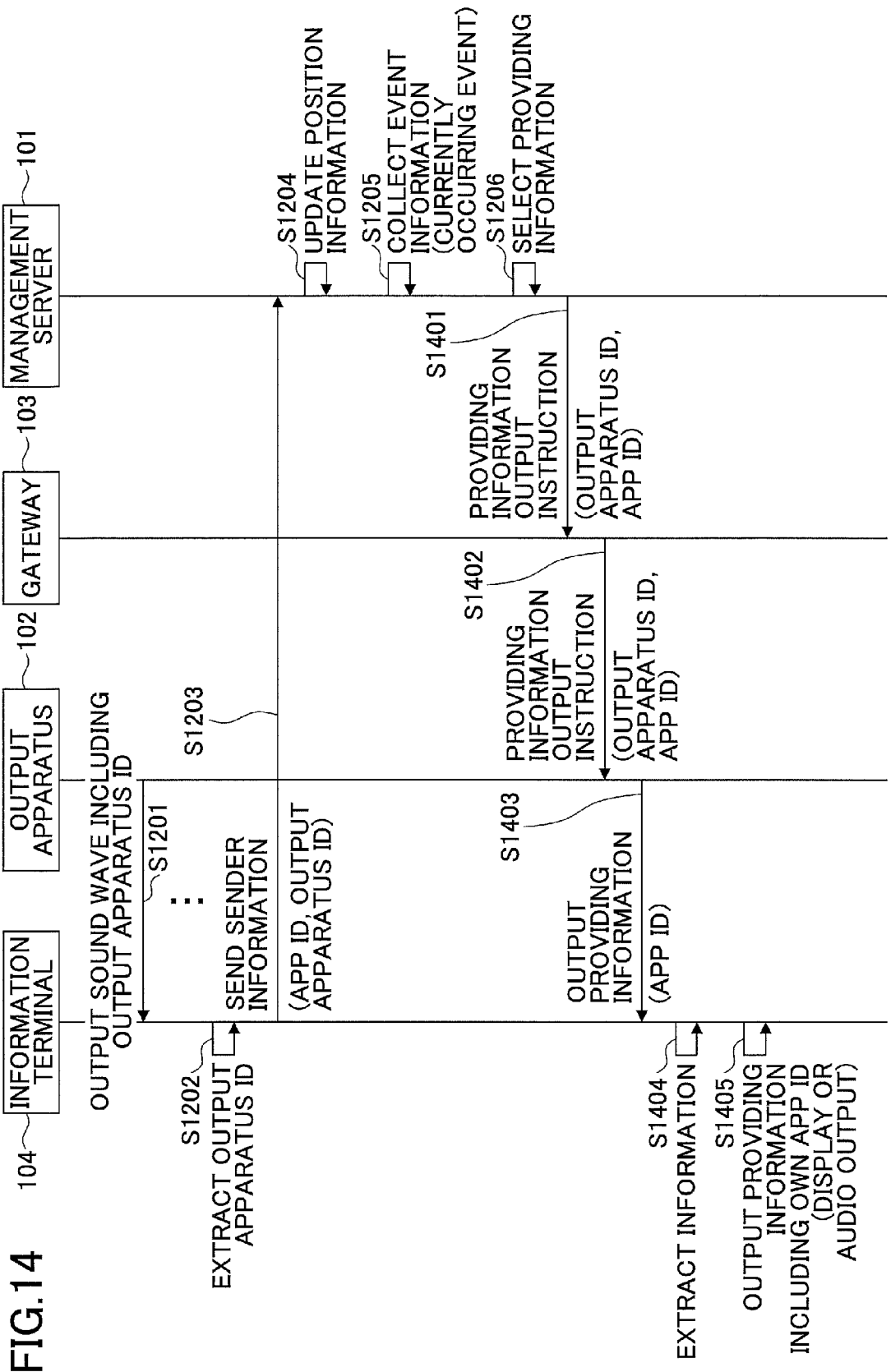
FIG. 14 is a sequence chart showing another example overall process operation of the information processing system.

FIG. 14 is a sequence chart showing an example process operation of the information processing system 100 according to the second embodiment. Note that the processes of steps S1201-S1206 of FIG. 14 are substantially identical to the processes of steps S1201-S1206 of the first embodiment as shown in FIG. 12.

In steps S1401 and S1402, the information providing unit 607 of the management server 101 conveys an output instruction to output the providing information selected by the providing information selecting unit 606 to the output unit 102 associated with the sender information terminal 104 via the gateway 103. The output instruction may include an output apparatus ID and an app ID, for example.

In step S1403, the output apparatus 102 that receives the output instruction to output the providing information from the management server 101 outputs the providing information according to the output instruction. For example, the output apparatus 102 may output a sound wave including the providing information and the app ID.

Also, in the case where the output instruction from the management server 101 includes an instruction to output the providing information in the form of an audible sound, the output apparatus 102 may output the providing information as an audible sound, for example.

In step S1404, the information extracting unit 633 of the information terminal 104 extracts information included in the sound wave that is acquired from output apparatus 102.

In step S1405, if the information extracted from the sound wave includes providing information including the app ID of the app run on the information terminal 104, the information extracting unit 633 of the information terminal 104 conveys the extracted providing information to the providing information receiving unit 636. Note that in this process, if the information extracted from the sound wave includes providing information addressed to one or more other information terminals 104, the information extracting unit 633 does not convey such providing information for the other information terminals 104 to the providing information receiving unit 636.

The providing information conveyed to the providing information receiving unit 636 may be displayed on the display/input unit 638 by the display control unit 637, for example. Note that at this time, the display screen displayed on the display/input unit 638 may be the same as that displayed in the first embodiment.

Also, in the case where the providing information conveyed to the providing information receiving unit 636 corresponds to an audible sound, the audio output unit 639 may output the audible sound as the providing information.

As described above, according to an aspect of the present embodiment, the management server 101 may be able to convey providing information to the information terminal 104 via the output apparatus 102. In this way, the information terminal 104 may be able to reduce data traffic by wireless communication, for example.

Other Embodiments

Figure 18:
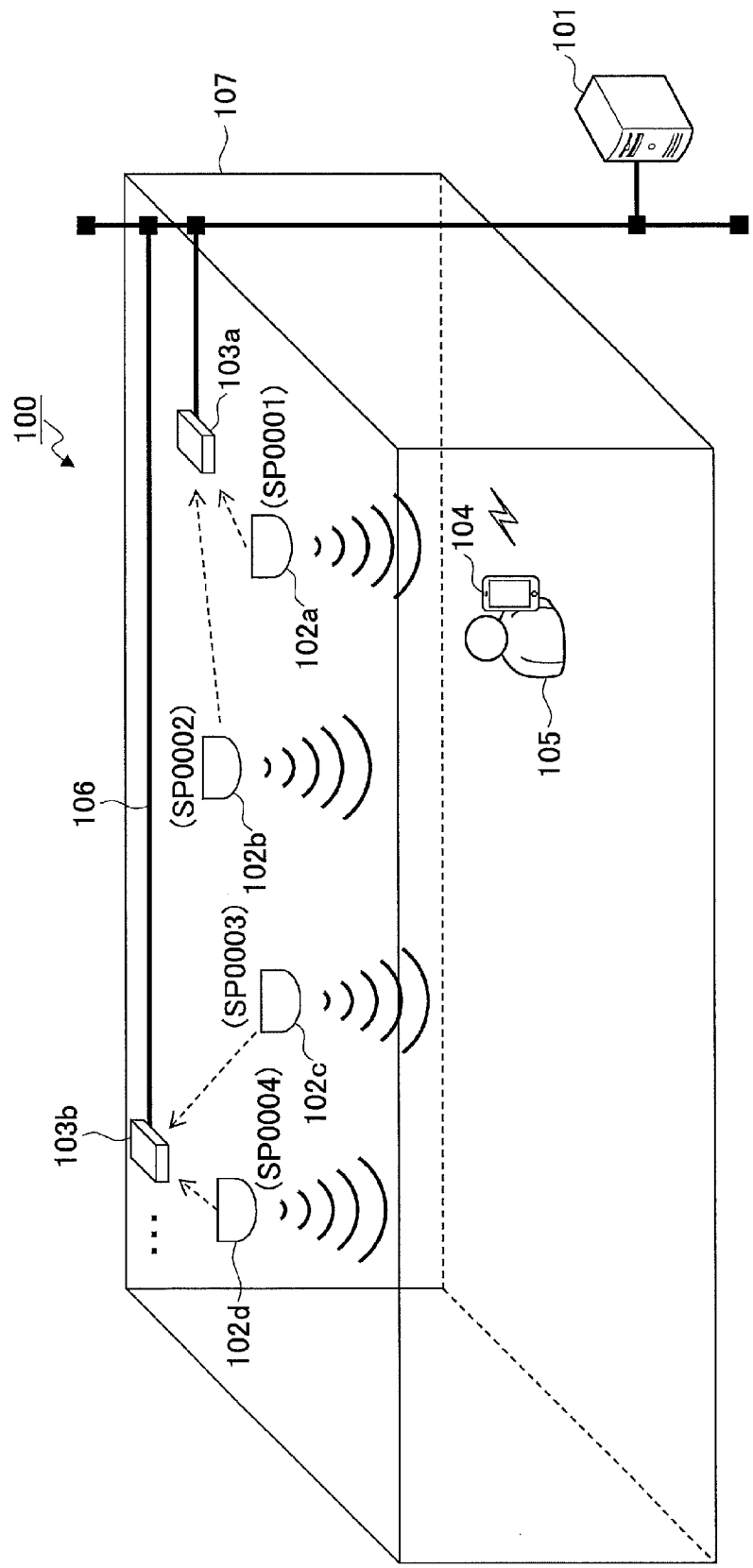
FIG. 18 is a diagram showing another example configuration of the information processing system according to an embodiment of the present invention.

Note that the configuration of the information processing system 100 described above is merely one example, and the information processing system 100 may have various other system configurations. For example, although the information processing system 100 shown in FIG. 1 includes only one gateway 103, in other embodiments, the information processing system 100 may include two or more gateways 103 (e.g., gateways 103a and 103b) as shown in FIG. 18.

Also, in some embodiments, the information processing system 100 may use multi-hop wireless technology, such as Zigbee, in establishing communication between a plurality of output apparatuses 102 to thereby expand the wireless network area, for example. Also, in some embodiments, the plurality of output apparatuses 102 may be connected to the network 106 by a wireless LAN or the like such that they may be able to communicate with the management server 101 without passing through the gateway 103, for example.

Further, in some embodiments, at least a part of the position information 611, the registration information 612, and/or the corresponding information 613 stored in the storage unit 610 of the management server 101 shown in FIG. 6 may be stored in an external server or the like, for example.

Further, although the registration information 612 managed by the registration information managing unit 603 of FIG. 6 is described as information storing an app ID in association with user information of a corresponding user as shown in FIG. 8, the registration information 612 is not limited to the above. For example, the registration information 612 may be information storing an app ID in association with app information indicating the type of app as shown in FIG. 19.

In this case, the corresponding information managing unit 604 may manage a plurality of sets of corresponding information 613 for the various types of apps based on the app information, for example, and the management server 101 may provide corresponding providing information to a user based on the event that is currently occurring and the app that is run by the user.

Further, although the corresponding information managing unit 604 is described as managing a plurality of sets of corresponding information 613 in the above embodiments, such a feature is not required as long as the corresponding information managing unit 604 manages at least one set of corresponding information.

Note that the management server 101 as described above is an example embodiment of an information processing apparatus according to the present invention. The CPU 201 is an example embodiment of a processor according to the present invention.

Although the present invention has been described above with reference to certain illustrative embodiments, the present invention is not limited to these embodiments, and numerous variations and modifications may be made without departing from the scope of the present invention.

What is claimed is:

1. An information processing apparatus that controls information to be provided according to an event that is occurring,
the information processing apparatus comprising:
a memory; and
a processor coupled to the memory and configured to execute steps of:
storing output apparatus identification information of an output apparatus received from a mobile terminal device that obtained it from a signal received from the output apparatus in association with position information of the output apparatus and
registration information, which associates application identification information of an application installed in the mobile terminal device with a type of the application;
acquiring terminal device information from the mobile terminal device, wherein the mobile terminal device information includes the application identification information of the application that is installed in the mobile terminal device and
the output apparatus identification information that has been output by the output apparatus and acquired by the mobile terminal device;
determining the position of the mobile terminal device based on the stored output apparatus identification information and the acquired terminal device information;
collecting event information relating to the event that is occurring;
selecting providing information to be provided to the mobile terminal device based on the registration information, the acquired application identification information, and the collected event information; and
sending the selected providing information to the mobile terminal device.

2. The information processing apparatus according to claim 1, wherein the processor sends the selected providing information directly to the terminal device.

3. The information processing apparatus according to claim 1, wherein the processor controls the output apparatus that is associated with the terminal device to output the selected providing information.

4. The information processing apparatus according to claim 1, wherein the output apparatus outputs at least one of a sound wave including the own apparatus information and a sound wave specified by an instruction from the information processing apparatus.

5. The information processing apparatus according to claim 1, wherein the own apparatus information output by the output apparatus includes identification information of the output apparatus.

6. The information processing apparatus according to claim 1, wherein the own apparatus information output by the output apparatus includes information relating to the position of the output apparatus.

7. An information processing method implemented by an information processing apparatus for providing information according to an event that is occurring,
the information processing method comprising:
storing output apparatus identification information of an output apparatus received from a mobile terminal device that obtained it from a signal received from the output apparatus in association with position information of the output apparatus and
registration information, which associates identification information of an application installed in the mobile terminal device with a type of the application;
acquiring terminal device information from the mobile terminal device,
wherein the terminal device information includes the application identification information of the application that is installed in the terminal device and
the output apparatus identification information that has been output by the output apparatus and acquired by the mobile terminal device;

determining the position of the mobile terminal device based on the stored output apparatus identification information and the acquired terminal device information;

collecting event information relating to the event that is occurring;

selecting providing information to be provided to the mobile terminal device based on the registration information, the acquired application identification information, and the collected event information; and sending the selected providing information to the mobile terminal device.

8. An information processing system that controls information to be provided according to an event that is occurring, the information system comprising:

a plurality of output apparatuses; and an information processing apparatus including a processor coupled to a memory and configured to execute steps of:

storing output apparatus identification information of an output apparatus received from a mobile terminal device that obtained it from a signal received from the output apparatus in association with position information of the output apparatus and registration information, which associates application identification information of an application installed in the mobile terminal device with a type of the application;

acquiring terminal device information from the mobile terminal device, wherein the terminal device information includes the application identification information of the application that is installed in the mobile terminal device and the output apparatus identification information that has been output by the output apparatus and acquired by the mobile terminal device;

determining the position of the mobile terminal device based on the stored output apparatus identification information and the acquired terminal device information;

collecting event information relating to the event that is occurring;

selecting providing information to be provided to the mobile terminal device based on the registration information, the acquired application identification information, and the collected event information; and sending the selected providing information to the mobile terminal device.

* * * * *